United States Patent
Hsieh et al.

(10) Patent No.: US 12,249,914 B2
(45) Date of Patent: Mar. 11, 2025

(54) QUICK RESPONSE SWITCHING POWER CONVERTER AND CONVERSION CONTROL CIRCUIT THEREOF

(71) Applicant: Richtek Technology Corporation, Hsinchu (TW)

(72) Inventors: Hsien-Cheng Hsieh, Hsinchu (TW); Chieh-Han Kuo, Hsinchu (TW); Hsing-Shen Huang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 305 days.

(21) Appl. No.: 18/149,677

(22) Filed: Jan. 4, 2023

(65) Prior Publication Data

US 2023/0238883 A1   Jul. 27, 2023

Related U.S. Application Data

(60) Provisional application No. 63/303,040, filed on Jan. 26, 2022.

(30) Foreign Application Priority Data

Jul. 11, 2022 (TW) .................................. 111125978

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC ... H02M 3/158; H02M 1/0025; H02M 3/1566
See application file for complete search history.

(56) References Cited

U.S. PATENT DOCUMENTS

2010/0123446 A1* 5/2010 Cheng ................. H02M 3/1588
                                                               323/288
2017/0201175 A1* 7/2017 Chen ..................... H02M 3/156

* cited by examiner

*Primary Examiner* — Kyle J Moody
(74) *Attorney, Agent, or Firm* — Huan-Yi Lin

(57) ABSTRACT

A conversion control circuit controls a power stage circuit of a switching power converter according to a first feedback signal and a second feedback signal, wherein the conversion control circuit includes an error amplifier circuit, a ramp signal generation circuit, a pulse width modulation circuit, and a quick response control circuit. The quick response control circuit performs a quick response control function, wherein the quick response control function includes: comparing the second feedback signal with at least one reference threshold to generate a quick response control signal; and when the second feedback signal crosses the reference threshold, adjusting a slope of a ramp signal according to the quick response control signal to accelerate an increase or decrease of the duty of a PWM signal, thereby accelerating the transient response of the switching power converter.

20 Claims, 19 Drawing Sheets

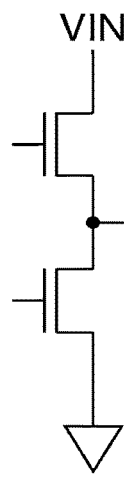 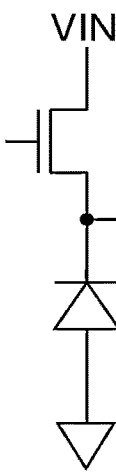 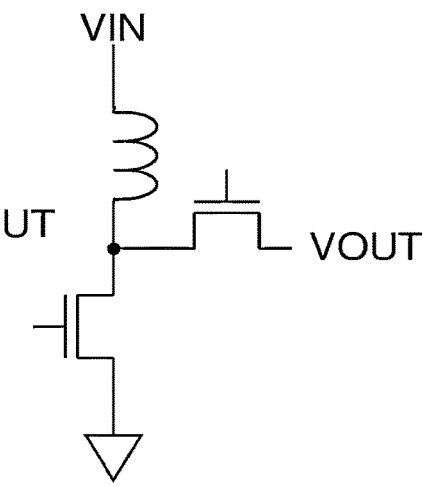
Fig. 16A　　　　　Fig. 16B　　　　　Fig. 16C
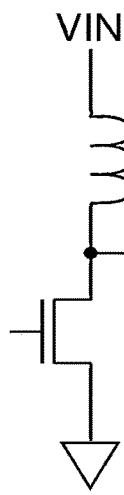 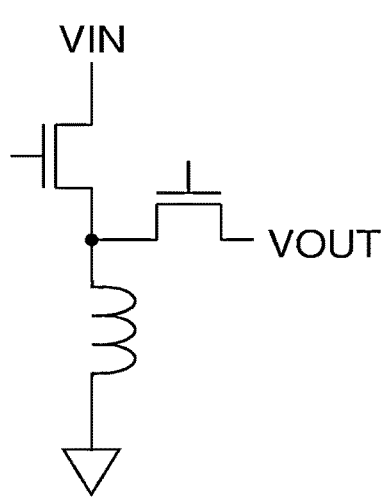 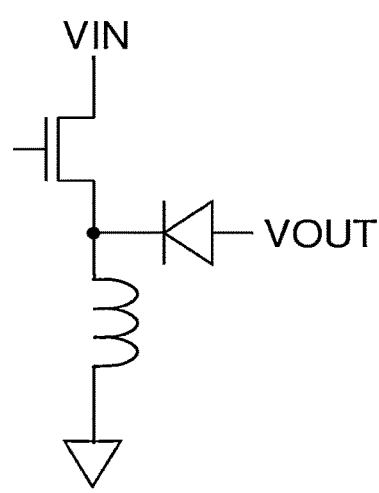
Fig. 16D　　　　　Fig. 16E　　　　　Fig. 16F

QUICK RESPONSE SWITCHING POWER CONVERTER AND CONVERSION CONTROL CIRCUIT THEREOF

CROSS REFERENCE

The present invention claims priority to U.S. 63/303,040 filed on Jan. 26, 2022 and claims priority to TW 111125978 filed on Jul. 11, 2022.

BACKGROUND OF THE INVENTION

Field of Invention

The present invention relates to a switching power converter; particularly, it relates to a quick response switching power converter. The present invention also relates to a conversion control circuit adapted for use in the quick response switching power converter.

Description of Related Art

In an ideal condition, a switching power converter should maintain a stable output power regardless how the load changes. However, in a real condition, a power supply is affected by the transient variation of the load, causing variation in the output power. Please refer to FIG. 1, which is a schematic diagram of waveforms showing the load transient response of the prior art. As shown in FIG. 1, when a load current ILoad changes sharply, the output voltage VOUT generated by the power supply will respond correspondingly, wherein when the load current ILoad increases sharply, the output voltage VOUT will suffer an undershoot and later become stable (as shown by the dashed frame Sq1); when the load current ILoad decreases sharply, the output voltage VOUT will suffer an overshoot, and afterward an undershoot, and become stable (as shown by the dashed frame Sq2).

In view of the above, to overcome the drawbacks in the prior art, the present invention proposes a quick response switching power converter and a conversion control circuit thereof, to mitigate the negative effects caused by load transient variation, thereby improving the stability of the output power generated by a power supply.

SUMMARY OF THE INVENTION

The present invention provides a conversion control circuit, which is for use in a quick response switching power converter and is configured to control a power stage circuit according to a first feedback signal and a second feedback signal, the conversion control circuit comprising: an error amplifier circuit, which is configured to amplify a difference between the first feedback signal and a reference signal, so as to generate an error amplified signal; a ramp signal generation circuit, which is configured to generate a ramp signal; a pulse width modulation circuit, which is configured to compare the error amplified signal and the ramp signal to generate a pulse width modulation (PWM) signal, wherein the PWM signal is configured to control the power stage circuit, thereby regulating an output voltage to a predetermined target level; and a quick response control circuit, which is configured to perform a quick response control function, wherein the quick response control function includes: comparing the second feedback signal with at least one reference threshold to determine whether the output voltage crosses an output threshold, and generating a quick response control signal accordingly; and when the second feedback signal crosses the reference threshold, adjusting the slope of the ramp signal according to the quick response control signal, to accelerate an increase or decrease of a duty of the PWM signal, thereby accelerating a transient response of the quick response switching power converter; wherein the first feedback signal and the second feedback signal are positively related to the output voltage.

In some embodiments, the quick response control function further includes: when the second feedback signal crosses the reference threshold, adjusting the slope of the ramp signal according to an enable count of the quick response control signal, to adaptively increase or decrease the duty cycle of the PWM signal, thereby accelerating the transient response of the quick response switching power converter, wherein the enable count is a number of times that the quick response control signal is switched to an enable level.

In some embodiments, the ramp signal generation circuit includes a ramp current source, a capacitor, and at least one control switch, wherein the at least one control switch is configured to control the ramp current source to charge the capacitor according to a clock signal, so as to generate the ramp signal. The quick response control circuit includes at least one adjustment current source circuit which is configured to generate an adjusting current, and the quick response control circuit is configured to charge the capacitor by a current resulting from superimposing the adjusting current onto the current generated by the ramp current source when the quick response control signal is enabled, so as to accelerate the increase or decrease of the duty of the PWM signal, thereby accelerating the transient response of the quick response switching power converter.

In some embodiments, the at least one reference threshold includes a first reference threshold and/or a second reference threshold, and the at least one output threshold includes a first output threshold and/or a second output threshold. When the second feedback signal is higher than the first reference threshold, which indicates that the output voltage is higher than the first output threshold, the quick response control circuit controls the adjusting current to increase an absolute value of the slope of the ramp signal, thereby accelerating the decrease of the duty of the PWM signal, wherein the first output threshold is higher than the predetermined target level; and when the second feedback signal is lower than the second reference threshold, which indicates that the output voltage is lower than the second output threshold, the quick response control circuit controls the adjusting current to decrease the absolute value of the slope of the ramp signal, thereby accelerating the increase of the duty of the PWM signal, wherein the second output threshold is lower than the predetermined target level.

In some embodiments, the quick response control function further includes: when the quick response control signal is enabled for an n-th time, adjusting the slope of the ramp signal with an n-th time adjustment amount; and when the quick response control signal is enabled for an (n+1)-th time, adjusting the slope of the ramp signal with an (n+1)-th time adjustment amount; wherein, n is a positive integer, and an absolute value of the n-th time adjustment amount is higher than or equal to an absolute value of the (n+1)-th time adjustment amount.

In some embodiments, the quick response control function further includes: when a time-out period is exceeded after the quick response control signal is enabled for an m-th time, resetting the enable count of the quick response control signal, wherein m is a positive integer.

In some embodiments, the quick response control function further includes: performing at least once that the absolute value of the n-th time adjustment amount is higher than the absolute value of the (n+1)-th time adjustment amount.

In some embodiments, the first feedback signal is the second feedback signal.

In some embodiments, the ramp signal includes an inductor current related signal, wherein the inductor current related signal is related to a current of an inductor of the power stage circuit, a conduction current of at least one power switch of the power stage circuit, or an output current of an output power, wherein the output power includes the output voltage and the output current.

In some embodiments, the quick response control function further includes at least one of the following: when the second feedback signal crosses a third reference threshold, stopping controlling the power stage circuit; clamping the error amplified signal so that the error amplified signal does not exceed a predetermined clamping level; and/or when the second feedback signal crosses a fourth reference threshold, adjusting a frequency of the clock signal.

The present invention also provides a quick response switching power converter, comprising: a power stage circuit, which includes at least one power switch, the at least one power switch being configured to switch one terminal of an inductor and/or the other terminal of the inductor to convert an input power to an output power; a conversion control circuit, which is configured to control the at least one power switch according to a first feedback signal and a second feedback related to an output voltage of the output power; and a feedback circuit, which is configured to generate the first feedback signal and the second feedback signal according to the output voltage; wherein the conversion control circuit includes: an error amplifier circuit, which is configured to amplify a difference between the first feedback signal and a reference signal, so as to generate an error amplified signal; a ramp signal generation circuit, which is configured to generate a ramp signal; a pulse width modulation circuit, which is configured to compare the error amplified signal and the ramp signal to generate a pulse width modulation (PWM) signal, wherein the PWM signal is configured to control the power stage circuit, thereby regulating the output voltage to a predetermined target level; and a quick response control circuit, which is configured to perform a quick response control function, wherein the quick response control function includes: comparing the second feedback signal with at least one reference threshold to determine whether the output voltage crosses an output threshold, and generating a quick response control signal accordingly; and when the second feedback signal crosses the reference threshold, adjusting the slope of the ramp signal according to the quick response control signal, to accelerate an increase or decrease of a duty of the PWM signal, thereby accelerating a transient response of the quick response switching power converter.

The objectives, technical details, features, and effects of the present invention will be better understood with regard to the detailed description of the embodiments below, with reference to the attached drawings.

BRIEF DESCRIPTION OF THE DRAWINGS

FIG. 16A to FIG. 16J are schematic diagrams of a circuit of a power stage circuit according to some embodiments of the present invention.

DESCRIPTION OF THE PREFERRED EMBODIMENTS

The drawings as referred to throughout the description of the present invention are for illustration only, to show the interrelations among the circuits and signals, but they are not drawn in actual scale.

Figure 1:
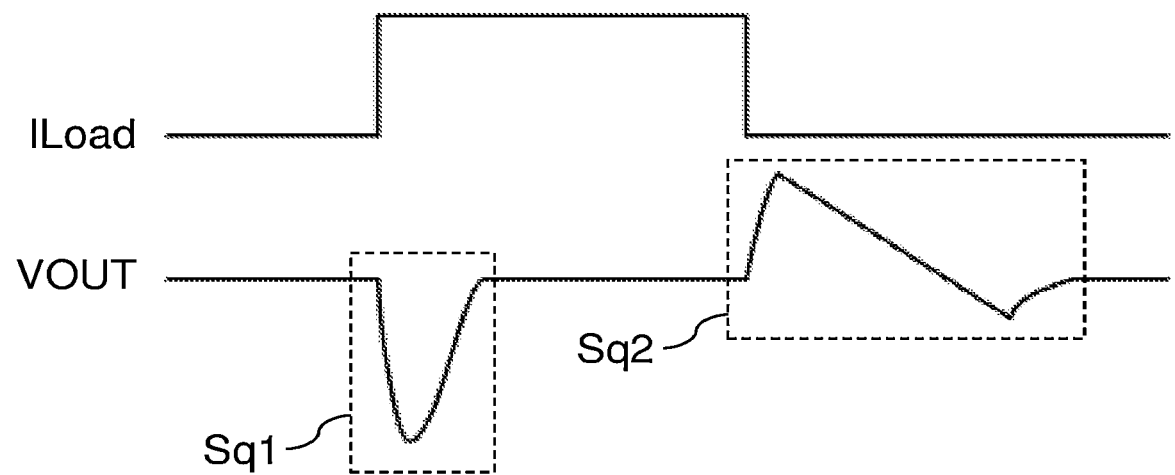
FIG. 1 is a schematic diagram of waveforms showing the load transient response of the prior art.
Figure 2:
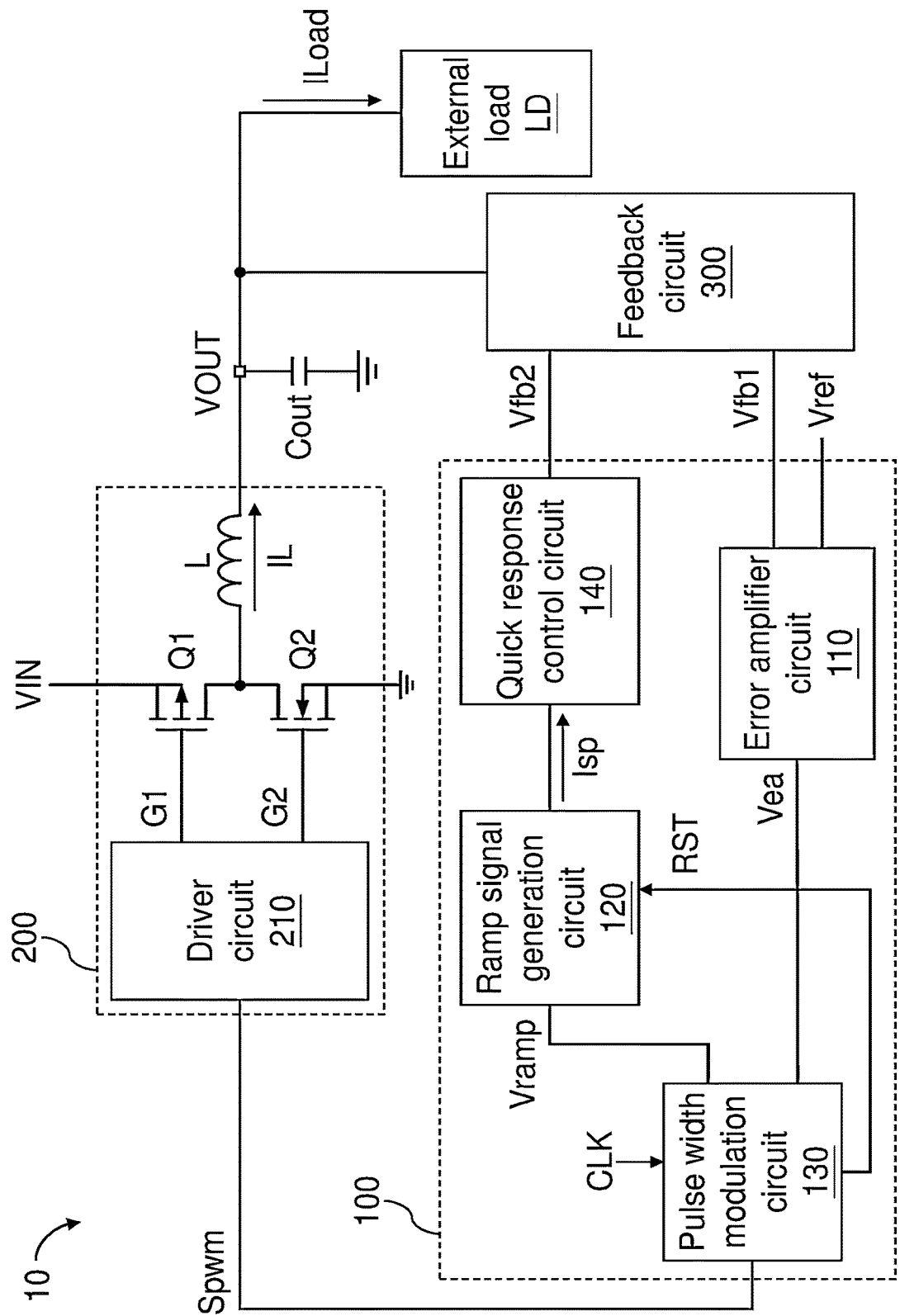
FIG. 2 is a schematic block diagram of a quick response switching power converter according to an embodiment of the present invention.

FIG. 2 is a schematic block diagram of a quick response switching power converter 10 according to an embodiment of the present invention. As shown in FIG. 2, the quick response switching power converter 10 includes a conversion control circuit 100, a power stage circuit 200 and a feedback circuit 300. The conversion control circuit 100 is configured to control the power stage circuit 200 according to a first feedback signal Vfb1 and a second feedback signal Vfb2. The power stage circuit 200 is configured to switch one terminal of an inductor L and/or the other terminal of the inductor L to convert an input power, to an output power which is supplied to an external load LD, wherein the input power includes an input voltage VIN and an input current, and the output power includes an output voltage VOUT and an output current. The feedback circuit 300 is configured to generate the first feedback signal Vfb1 and the second feedback signal Vfb2 according to the output voltage VOUT. The respective structures and functions of the conversion control circuit 100, the power stage circuit 200, and the feedback circuit 300 will be explained in detail below.

In some embodiments, the conversion control circuit 100 includes an error amplifier circuit 110, a ramp signal generation circuit 120, a pulse width modulation circuit 130, and a quick response control circuit 140, wherein the error amplifier circuit 110 is coupled to the pulse width modulation circuit 130 and the feedback circuit 300, and the ramp signal generation circuit 120 is coupled to the pulse width modulation circuit 130 and the quick response control circuit 140. The respective structures and functions of the error amplifier circuit 110, the ramp signal generation circuit 120, the pulse width modulation circuit 130, and the quick response control circuit 140 will be explained in detail below.

Figure 3:
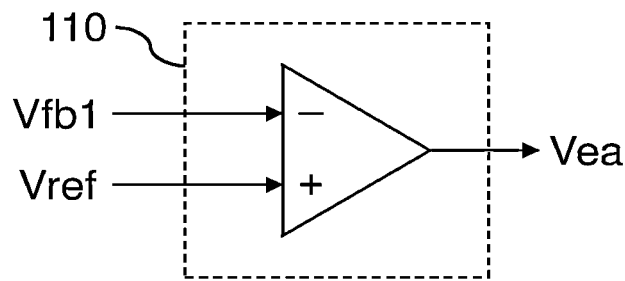
FIG. 3 is a schematic circuit diagram of an error amplifier circuit according to an embodiment of the present invention.

Please refer to FIG. 3. FIG. 3 is a schematic circuit diagram of the error amplifier circuit 110 according to an embodiment of the present invention, wherein the error amplifier circuit 110 is configured to amplify the difference between the first feedback signal Vfb1 and a reference signal Vref, so as to generate an error amplified signal Vea. As shown in FIG. 3, in some embodiments, the error amplifier circuit 110 is an error amplifier, wherein a non-inverting input terminal of the error amplifier is configured to receive the reference signal Vref, and an inverting input terminal of the error amplifier is configured to receive the first feedback signal Vfb1; the output terminal of the error amplifier outputs the error amplified signal Vea. An error amplifier is a well known circuit to a person having ordinary skills in the art, and thus its details are not redundantly explained herein.

In some embodiments, the error amplifier circuit 110 generates the error amplified signal Vea according to a difference between the first feedback signal Vfb1 and the reference signal Vref, so as to control the power stage circuit 200, thereby adjusting the output voltage VOUT according to the feedback, wherein the first feedback signal Vfb1 is positively related to the output voltage VOUT. By feedback control mechanism, in steady state, the level of the first feedback signal Vfb1 is regulated to the level of the reference signal Vref, that is, the output voltage VOUT is regulated to a predetermined target level. In some embodiments, the first feedback signal Vfb1 has excellent stability and is not easily affected by noise to cause variations in its output signal. In ideal condition, the level of the first feedback signal Vfb1 is maintained at the level of the reference signal Vref, and it is not affected by noise or load.

Figure 4:
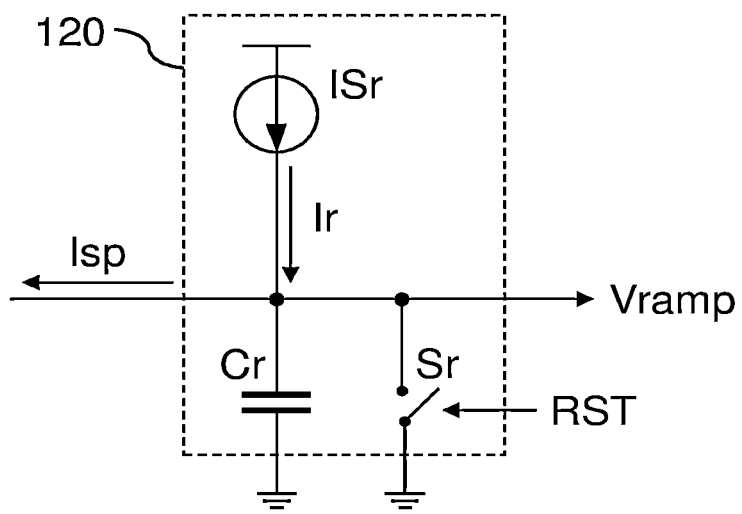
FIG. 4 is a schematic circuit diagram of a ramp signal generation circuit according to an embodiment of the present invention.

Please refer to FIG. 4. FIG. 4 is a schematic circuit diagram of the ramp signal generation circuit 120 according to an embodiment of the present invention, wherein the ramp signal generation circuit 120 is configured to generate a ramp signal Vramp. As shown in FIG. 4, in some embodiments, the ramp signal generation circuit 120 includes a ramp current source ISr, a capacitor Cr, and at least one control switch Sr, wherein the at least one control switch Sr operates according to a reset signal RST, so as to superimpose the current Ir provided by the ramp current source ISr onto an adjusting current Isp, and to integrate (i.e., to charge) the capacitor Cr by the resulted current, to thereby generate the ramp signal Vramp. When the reset signal RST is at low level (e.g. 0), the control switch Sr is turned off, so that the current resulting from the current Ir of the ramp current source ISr superimposed onto the adjusting current Isp integrates (charges) the capacitor Cr, whereby the ramp signal Vramp increases to a certain predetermined level; when the reset signal RST is at high level (e.g. 1), the control switch Sr is turned on, so that the ramp current source ISr stops integrating the capacitor Cr and the capacitor Cr discharges, whereby the ramp signal Vramp decreases to 0.

Figure 5:
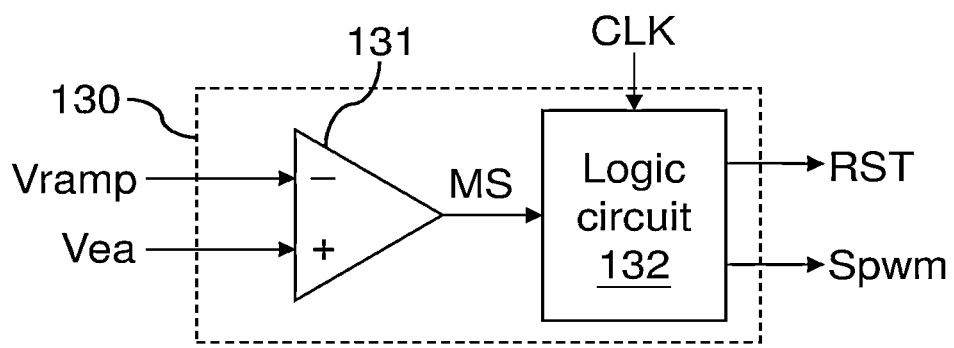
FIG. 5 is a schematic circuit diagram of a pulse width modulation circuit according to an embodiment of the present invention.

Please refer to FIG. 5. FIG. 5 is a schematic circuit diagram of the pulse width modulation circuit 130 according to an embodiment of the present invention, wherein the pulse width modulation circuit 130 is configured to generate a pulse width modulation (PWM) signal Spwm according to the error amplified signal Vea, the ramp signal Vramp and a clock signal CLK. The PWM signal Spwm is configured to control the power stage circuit 200, so as to regulate the output voltage VOUT to a predetermined target level. As shown in FIG. 5, in some embodiments, the pulse width modulation circuit 130 includes a comparator 131 and a logic circuit 132. The comparator 131 is configured to generate a relay signal MS according to the error amplified signal Vea and the ramp signal Vramp. The logic circuit 132 is configured to generate the reset signal RST and the PWM signal Spwm according to the relay signal MS and the clock signal CLK. A comparator is a well known circuit to a person having ordinary skills in the art, and thus its details are not redundantly explained herein.

Figure 6A:
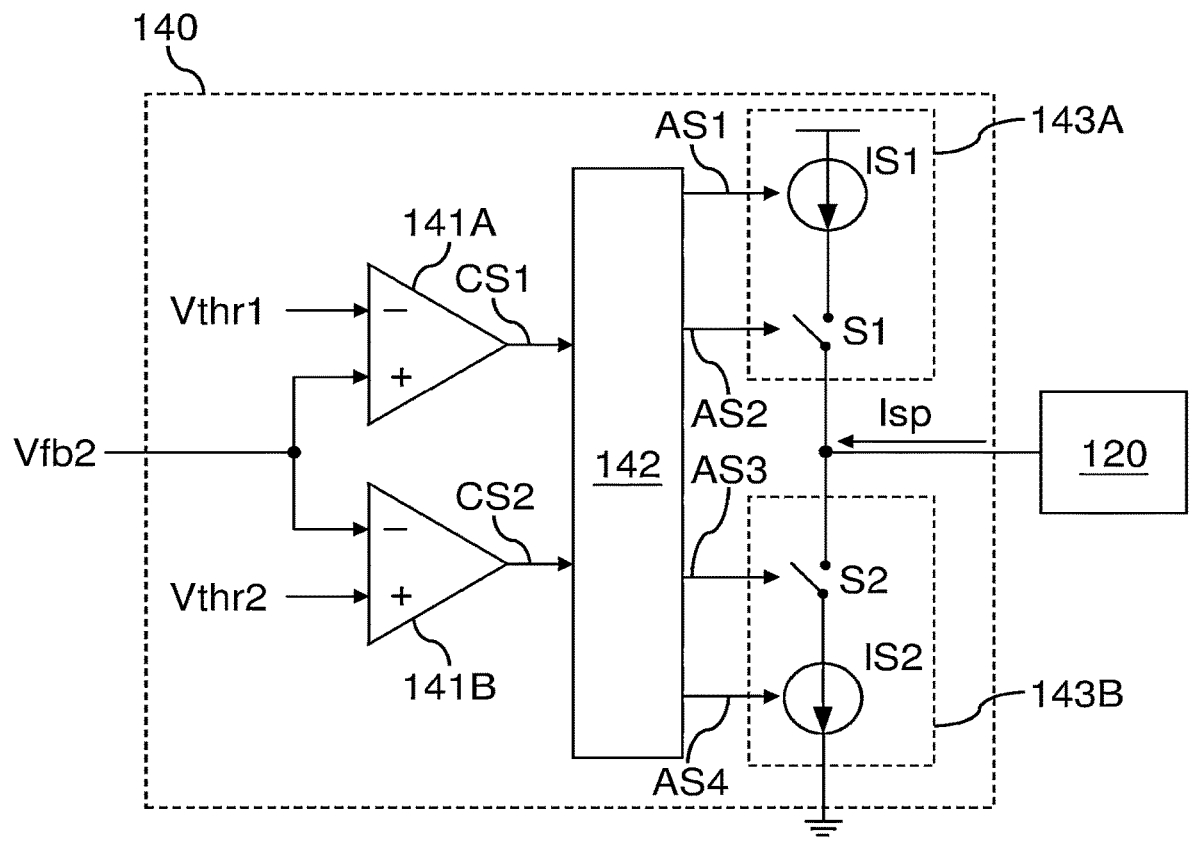
FIG. 6A is a schematic circuit diagram of a quick response control circuit according to an embodiment of the present invention.

Please refer to FIG. 6A. FIG. 6A is a schematic circuit diagram of the quick response control circuit 140 according to an embodiment of the present invention, wherein the quick response control circuit 140 is configured to perform a quick response control function according to the second feedback signal Vfb2, thereby generating a quick response control signal to accelerate the transient response of the quick response switching power converter 10. As shown in FIG. 6A, in some embodiments, the quick response control circuit 140 includes plural comparators 141A, 141B, an adjustment circuit 142, and plural adjustment current source circuits 143A, 143B. The adjustment current source circuit 143A includes a first current source IS1 and a first switch S1; the adjustment current source circuit 143B includes a second current source IS2 and a second switch S2. The respective structures and functions of comparators 141A, 141B, the adjustment circuit 142, and the current source circuits 143A, 143B will be explained in detail below.

In some embodiments, the comparators 141A, 141B are configured to determine whether an absolute value of the second feedback signal Vfb2 crosses (i.e., passes over) at least one reference threshold, wherein the comparator 141A is configured to determine whether the second feedback signal Vfb2 is higher than a first reference threshold Vthr1, and the comparator 141B is configured to determine whether the second feedback signal Vfb2 is lower than a second reference threshold Vthr2. As shown in FIG. 6A, in this embodiment, the inverting input terminal of the comparator 141A is configured to receive the first reference threshold Vthr1; the non-inverting input terminal of the comparator 141B is configured to receive the second reference threshold Vthr2; the non-inverting input terminal of the comparator 141A and the inverting input terminal of the comparator 141B are configured to receive the second feedback signal Vfb2; the output terminal of the comparator 141A is configured to output a comparing signal CS1; and the output terminal of the comparator 141B is configured to output a comparing signal CS2. In this embodiment, the quick response control signal includes the comparing signal CS1 and the comparing signal CS2. As mentioned above, a comparator is a well known circuit to a person having ordinary skills in the art, and thus the details of the comparators 141A, 141B are not redundantly explained herein.

In some embodiments, when the second feedback signal Vfb2 is higher than the first reference threshold Vth1, the comparator 141A outputs the comparing signal CS1 at high level (e.g. 1); when the second feedback signal Vfb2 is lower than the second reference threshold Vth2, the comparator 141B outputs the comparing signal CS2 at high level (e.g. 1). On the other hand, when the second feedback signal Vfb2 is lower than the first reference threshold Vth1, the comparator 141A outputs the comparing signal CS1 at low level (e.g. 0); when the second feedback signal Vfb2 is higher than the second reference threshold Vth2, the comparator 141B outputs the comparing signal CS2 at low level (e.g. 0).

In some embodiments, the first reference threshold Vth1 and the second reference threshold Vth2 are generated according to a predetermined reference threshold, wherein the predetermined reference threshold, for example, is the level of the reference signal Vref; the first reference threshold Vthr1, for example, is the predetermined reference threshold plus an offset threshold, and the second reference threshold Vthr2, for example, is the predetermined reference threshold minus the offset threshold. In some embodiments, when the predetermined reference threshold is 0, the first reference threshold Vthr1 is a positive number and the second reference threshold Vthr2 is a negative number, and the absolute value of the first reference threshold Vthr1 is equal to the absolute value of the second reference threshold Vthr2.

As shown in FIG. 6A, in some embodiments, when the second feedback signal Vfb2 is higher than the first reference threshold Vthr1, the comparator 141A outputs the comparing signal CS1 at high level as the quick response control signal. When the comparing signal CS1 is at high level, the adjustment circuit 142 generates an adjusting signal AS2 at high level to turn on the first switch S1, so that the current generated by the first current source IS1 is used as the adjusting current Isp to flow into the ramp signal generation circuit 120 in the opposite direction to the adjusting current Isp shown in FIG. 6A (that is, the adjusting current Isp is a negative current at this moment). After being superimposed with the current Ir, the total current that charges the capacitor Cr increases, so that the slope of the ramp signal Vramp increase, thereby accelerating the decrease of the duty of the PWM signal Spwm, so as to relieve the overshoot of the output voltage VOUT.

When the second feedback signal Vfb2 is lower than the first reference threshold Vthr1, the comparing signal CS1 is at low level; and when the second feedback signal Vfb2 is also lower than the second reference threshold Vthr2, the comparing signal CS2 is at high level as the quick response control signal. The adjustment circuit 142 generates the adjusting signal AS2 at low level and an adjusting signal AS3 at high level to turn off the first switch S1 and turn on the second switch S2, so that the current generated by the second current source IS2 is used as the adjusting current Isp to flow out the ramp signal generation circuit 120 in the same direction as the adjusting current Isp shown in FIG. 6A (that is, the adjusting current Isp is a positive current at this moment). After being superimposed with the current Ir, the total current that charges the capacitor Cr decreases, so that the slope of the ramp signal Vramp decreases, thereby accelerating the increase of the duty of the PWM signal Spwm, so as to relieve the undershoot of the output voltage VOUT.

When the second feedback signal Vfb2 is lower than the first reference threshold Vthr1, and the second feedback signal Vfb2 is higher than the second reference threshold Vthr2, the comparing signal CS1 and the comparing signal CS2 are at low level. The adjustment circuit 142 generates the adjusting signals AS2 and AS3 at low level, so that the first switch S1 and the second switch S2 are turned off, which indicates that the output voltage VOUT does not cross an output threshold, so there is no need to accelerate the adjustment of the output voltage VOUT according to the quick response control signal.

In other words, in some embodiments, the adjusting signal AS2 and AS3 are configured to control the conduction states of the first switch S1 and the second switch S2, respectively. In some embodiments, when the comparing signal CS1 is at high level and the comparing signal CS2 is at low level, the comparing signal CS1 is used as the quick response control signal, so that the adjustment circuit 142 generates the adjusting signal AS2 at high level and the adjusting signal AS3 at low level, to turn on the first switch S1 and turn off the second switch S2. When the comparing signal CS1 is at low level and the comparing signal CS2 is at high level, the comparing signal CS2 is used as the quick response control signal, so that the adjustment circuit 142 generates the adjusting signal AS2 at low level and the adjusting signal AS3 at high level, to turn off the first switch S1 and turn on the second switch S2. When the comparing signal CS1 and the comparing signal CS2 are both at low level, the adjustment circuit 142 generates the adjusting signal AS2 and AS3 both at low level, so that the first switch S1 and the second switch S2 are both turned off, which indicates that the quick response control signal does not adjust the slope of the ramp signal Vramp. In some embodiments, the adjustment circuit 142 can further adjust the adjusting signal AS1 and an adjusting signal AS4 according to the comparing signal CS1 and the comparing signal CS2, so as to adjust the current of the first current source IS1 and the current of the second current source IS2, respectively.

In some embodiments, the adjustment current source circuits 143A and 143B are configured to generate an adjusting current Isp according to the adjusting signal AS1, AS2, AS3, and AS4, thereby adjusting the slope of the ramp signal Vramp, wherein the first current source IS1 and the second current source IS2 are configured to adjust the adjusting current Isp, and the first switch S1 and the second switch S2 are configured to control the conduction states of the first current source IS1 and the second current source IS2, respectively. When the first switch S1 is turned on, the first current source IS1 decreases the adjusting current Isp; when the second switch S2 is turned on, the second current source IS2 increases the adjusting current Isp; when the first switch S1 and the second switch S2 are both turned off, the adjusting current is 0, and the quick response control signal is disabled at this moment, so that the quick response control circuit 140 does not adjust the slope of the ramp signal Vramp.

Figure 6B:
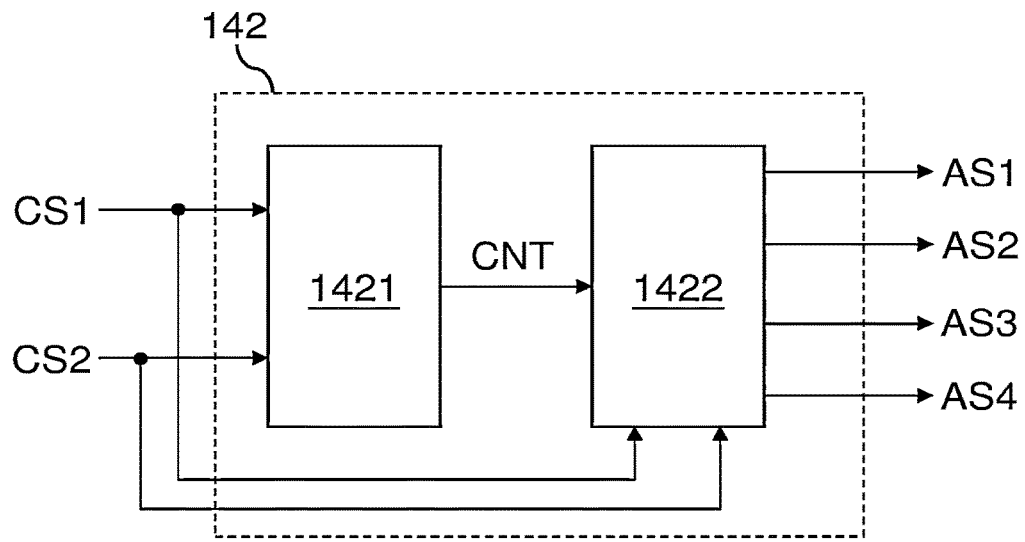
FIG. 6B is a schematic circuit diagram of an adjustment circuit according to an embodiment of the present invention.

Please refer to FIG. 6B. FIG. 6B is a schematic circuit diagram of the adjustment circuit 142 according to an embodiment of the present invention, wherein the adjustment circuit 142 is configured to generate plural adjusting signals AS1-AS4 according to the comparing signals CS1 and CS2. As shown in FIG. 6B, the adjustment circuit 142 includes a counter circuit 1421 and a determination circuit 1422, wherein the counter circuit 1421 is configured to count the number of times that the comparing signals CS1 and CS2 are switched to an enable level (e.g. high voltage), so as to generate an enable count CNT. In some embodiments, the determination circuit 1422 generates the adjusting signals AS1-AS4 further according to the enable count CNT.

Not that the number of times counted by the counter circuit 1421, i.e., the number that the comparing signals CS1 and CS2 are switched to an enable level, indicates the number of times that the second feedback signal Vfb2 increases to cross the first reference threshold Vthr1, or the number of times that the second feedback signal Vfb2 decreases to cross the second reference threshold Vthr2, as expressed by the enable count CNT. How the determination circuit 1422 generates the adjusting signals AS1-AS4 further according to the enable count CNT will be described later.

Figure 7:
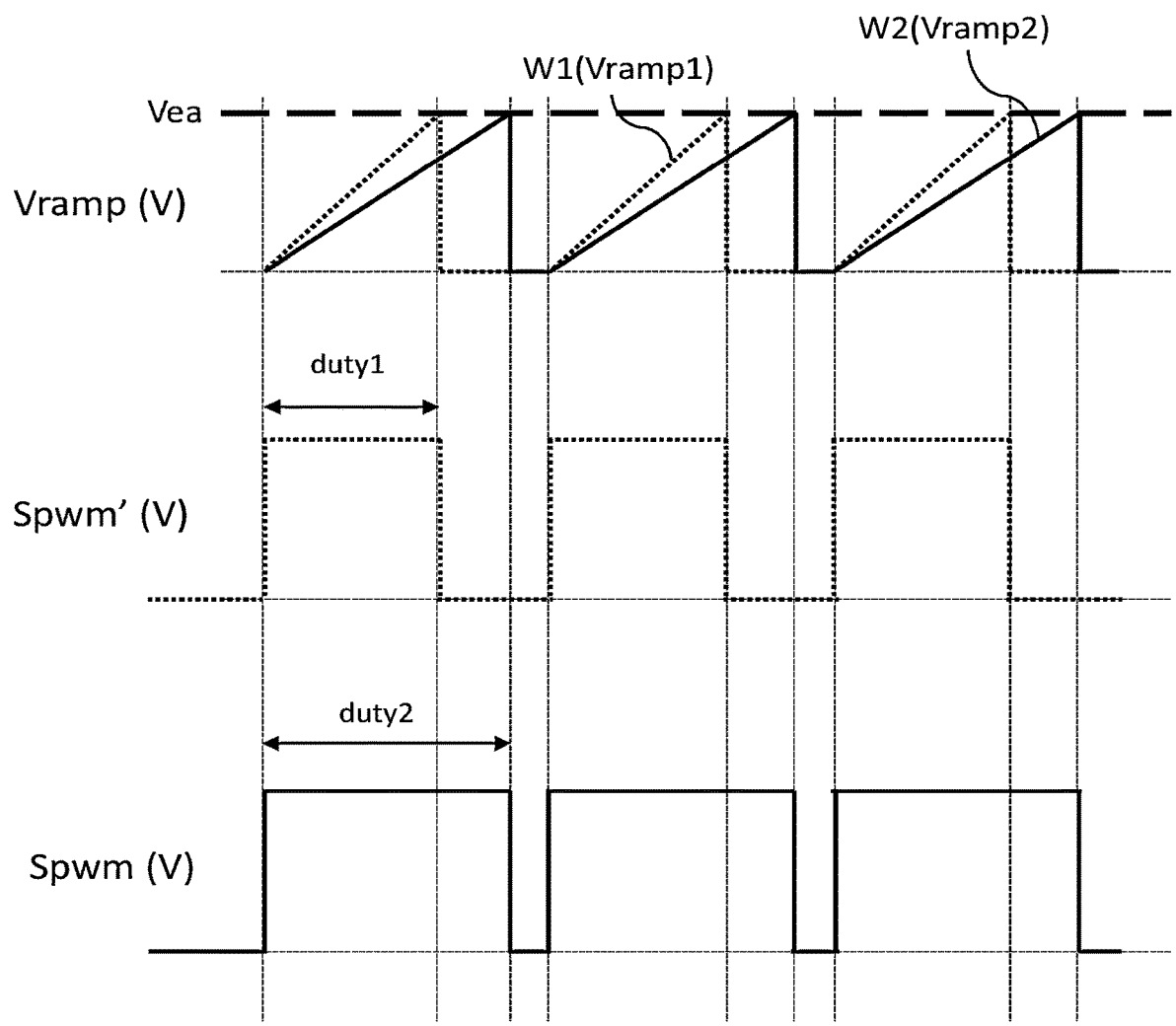
FIG. 7 is a schematic diagram of voltage waveforms of a ramp signal and pulse width modulation signals according to an embodiment of the present invention.

In some embodiments, when the quick response control signal is enabled (that is, the adjusting current Isp is not 0), the quick response control circuit 140 will superimpose the adjusting current Isp onto the current Ir of the ramp current source ISr, and the resulted current integrates (charges) the capacitor Cr, so as to adjust the slope of a ramp signal Vramp to accelerate the increase or decrease of the duty of a PWM signal Spwm, thereby accelerating the transient response of the quick response switching power converter 140. Please refer to FIG. 7. FIG. 7 is a schematic diagram of voltage waveforms of the ramp signal Vramp, the initial PWM signal Spwm', and the PWM signal Spwm according to an embodiment of the present invention.

As shown in FIG. 7, in the ramp signal Vramp of this embodiment, the dotted line waveform W1 indicates the initial ramp signal Vramp1 before adjustment, and the solid line waveform W2 indicates the ramp signal Vramp2 after adjustment by the quick response control circuit 140. As shown in FIG. 7, for example, when the second feedback signal Vfb2 is lower than the second reference threshold Vthr2, since the quick response control circuit 140 decreases the slope of the initial ramp signal Vramp1, the slope of the ramp signal Vramp is lower than the slope of the initial ramp signal Vramp1, whereby the time point at which the level of the adjusted ramp signal Vramp2 reaches the error amplified signal Vea is later than the time point at which the level of the initial ramp signal Vramp1 reaches the error amplified signal Vea, and accordingly the duty duty2 of the PWM signal Spwm is higher than the duty duty1 of the initial PWM signal Spwm', thereby accelerating the transient response of the quick response switching power converter 140.

The mechanism to generate the PWM signal shown in FIG. 7 is to switch the PWM signal from high level to low level at the time point at which the level of the ramp signal reaches the error amplified signal. However, according to the spirit of the present invention, other mechanisms of generating the PWM signal are also applicable, with corresponding modifications of the conversion control circuit in generating the PWM signal and other signals. A person having ordinary skills in the art can infer variations from the teaching of the present invention by analogy.

Please refer to FIG. 2. In some embodiments, the power stage circuit 200 includes a driver circuit 210, plural power switches Q1 and Q2, and an inductor L. The driver circuit 210 is coupled to the control terminals of the power switches Q1 and Q2. One terminal of the power switch Q1 is coupled to an input power; another terminal of the power switch Q1 is coupled to one terminal of the power switch Q2; another terminal of the power switch Q2 is grounded; one terminal of the inductor L is coupled between the other terminal of the power switch Q1 and the one terminal of the power switch Q2; the other terminal of the inductor L is coupled to an output capacitor Cout and the external load LD. The driver circuit 210 is configured to generate plural control signals G1 and G2 to respectively control the power switches Q1 and Q2, wherein the power switches Q1 and Q2 are configured to switch the terminal or terminals of an inductor L to convert the input power to an output power. Take FIG. 2 for example, in this embodiment, the power switches Q1 and Q2 switch the terminal of the inductor L between the input voltage VIN and a ground potential.

In some embodiments, the power switch Q1 is a P-type metal-oxide-semiconductor field-effect transistor (PMOS), and the power switch Q2 is an N-type metal-oxide-semiconductor field-effect transistor (NMOS). The control terminal of the power switch Q1 corresponds to the gate of the PMOS; the one terminal of the power switch Q1 corresponds to the source of the PMOS; and the another terminal of the power switch Q1 corresponds to the drain of the PMOS. The control terminal of the power switch Q2 corresponds to the gate of the NMOS; the one terminal of the power switch Q2 corresponds to the drain of the NMOS; and the another terminal of the power switch Q2 corresponds to the source of the NMOS.

Figure 8A:
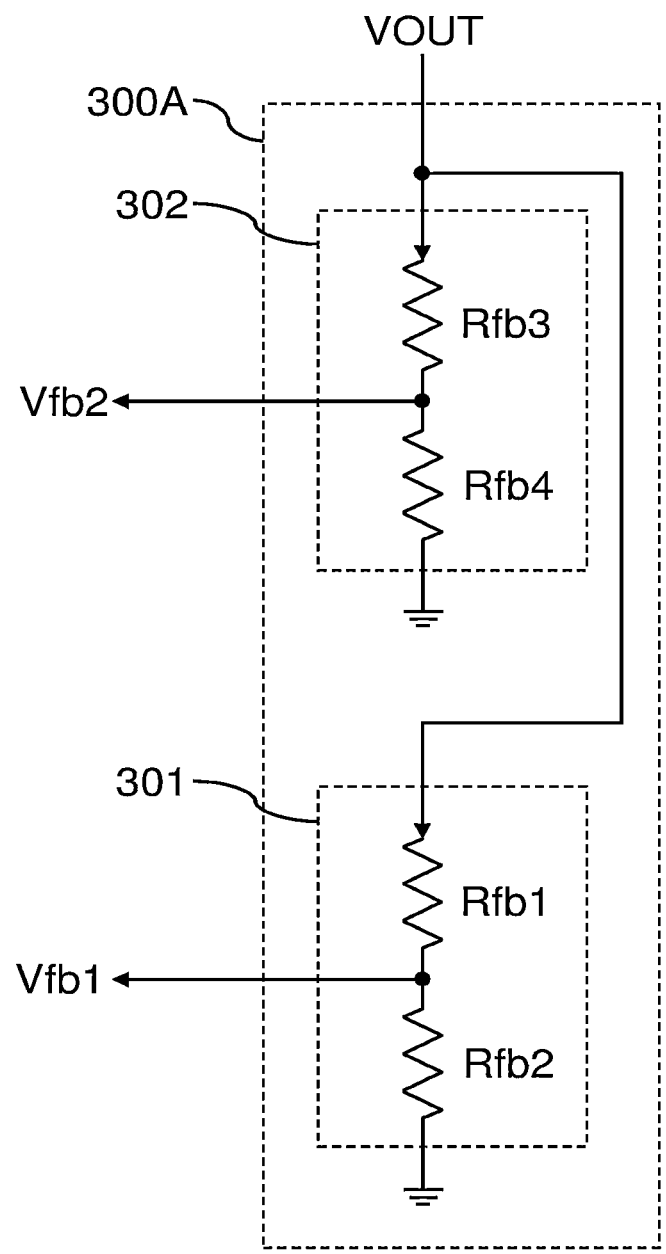
FIG. 8A is a schematic circuit diagram of a feedback circuit according to an embodiment of the present invention.
Figure 8B:
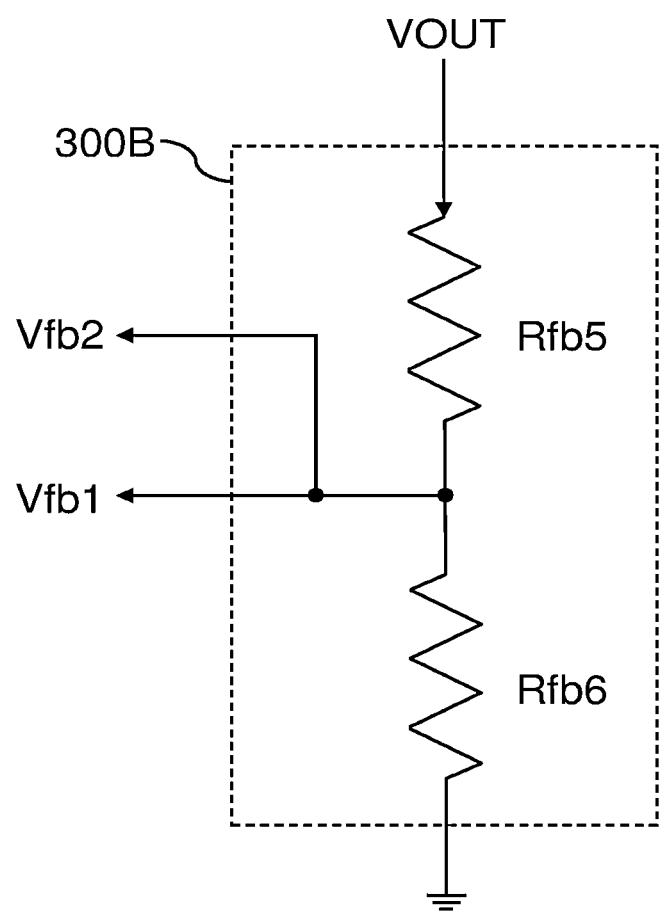
FIG. 8B is a schematic circuit diagram of a feedback circuit according to another embodiment of the present invention.

Please refer to FIG. 8A and FIG. 8B. FIG. 8A and FIG. 8B are schematic circuit diagrams of feedback circuits 300A and 300B according to an embodiment of the present invention, wherein the feedback circuits 300A and 300B correspond to the feedback circuit 300 in FIG. 2. As shown in FIG. 8A, in this embodiment, the feedback circuit 300A includes plural divider circuits 301 and 302, wherein the divider circuit 301 includes plural resistors Rfb1 and Rfb2, and the divider circuit 302 includes plural resistors Rfb3 and Rfb4. In some embodiments, the first feedback signal Vfb1 and the second feedback signal Vfb2 are related to the output voltage VOUT, wherein the resistor Rfb1 and the resistor Rfb2 determine the ratio between the first feedback signal Vfb1 and the output voltage VOUT, and the resistor Rfb3 and the resistor Rfb4 determine the ratio between the second feedback signal Vfb2 and the output voltage VOUT. Taking the divider circuit 301 for example, when the resistor Rfb1 is 4000 ohms and the resistor Rfb2 is 1000 ohms, the ratio between the output voltage VOUT and the first feedback signal Vfb1 is 5:1. That is, the output voltage VOUT is 5 times the first feedback signal Vfb1.

In some embodiments, the first feedback signal Vfb1 is the second feedback signal Vfb2. As shown in FIG. 8B, in this embodiment, the feedback circuit 300B includes plural resistors Rfb5 and Rfb6, wherein the resistor Rfb5 and the resistor Rfb6 determine the ratio between the first feedback signal Vfb1 (the second feedback signal Vfb2) and the output voltage VOUT. For example, when the resistor Rfb5 is 4000 ohms and the resistor Rfb6 is 1000 ohms, the ratio between the output voltage VOUT and the first feedback signal Vfb1 (or the second feedback signal Vfb2) is 5:1. That is, the output voltage VOUT is 5 times the first feedback signal Vfb1 (or the second feedback signal Vfb2).

Figure 9A:
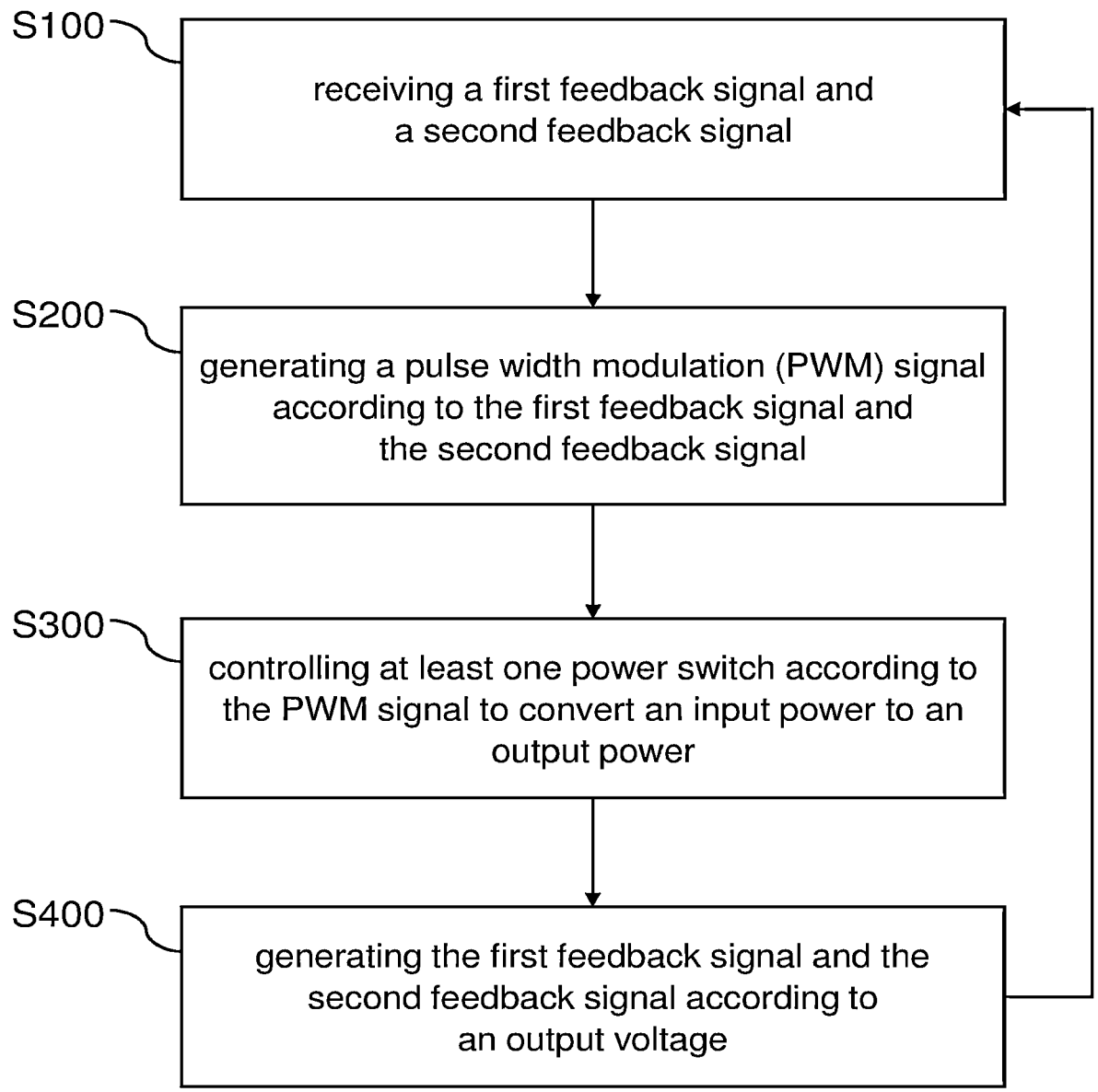
FIG. 9A is an operation flow chart of a quick response switching power converter according to an embodiment of the present invention.

Please refer to FIG. 2 and FIG. 9A. FIG. 9A is an operation flow chart of the quick response switching power converter 10 according to an embodiment of the present invention. As shown in FIG. 9A, when the quick response switching power converter 10 starts operating, the conversion control circuit 100 of the quick response switching power converter 10 receives a first feedback signal Vfb1 and a second feedback signal Vfb2 (step S100), and generates a pulse width modulation (PWM) signal Spwm according to the first feedback signal Vfb1 and the second feedback signal Vfb2 (step S200). The power stage circuit 200 of the quick response switching power converter 10 controls the power switches Q1 and Q2 of the power stage circuit 200 according to the PWM signal Spwm to convert an input power to an output power (step S300). And, the feedback circuit 300 of the quick response switching power converter 10 generates the first feedback signal Vfb1 and the second feedback signal Vfb2 according to an output voltage VOUT (step S400). The quick response switching power converter 10 repeats step S100 to step S400 during its operation.

Figure 9B:
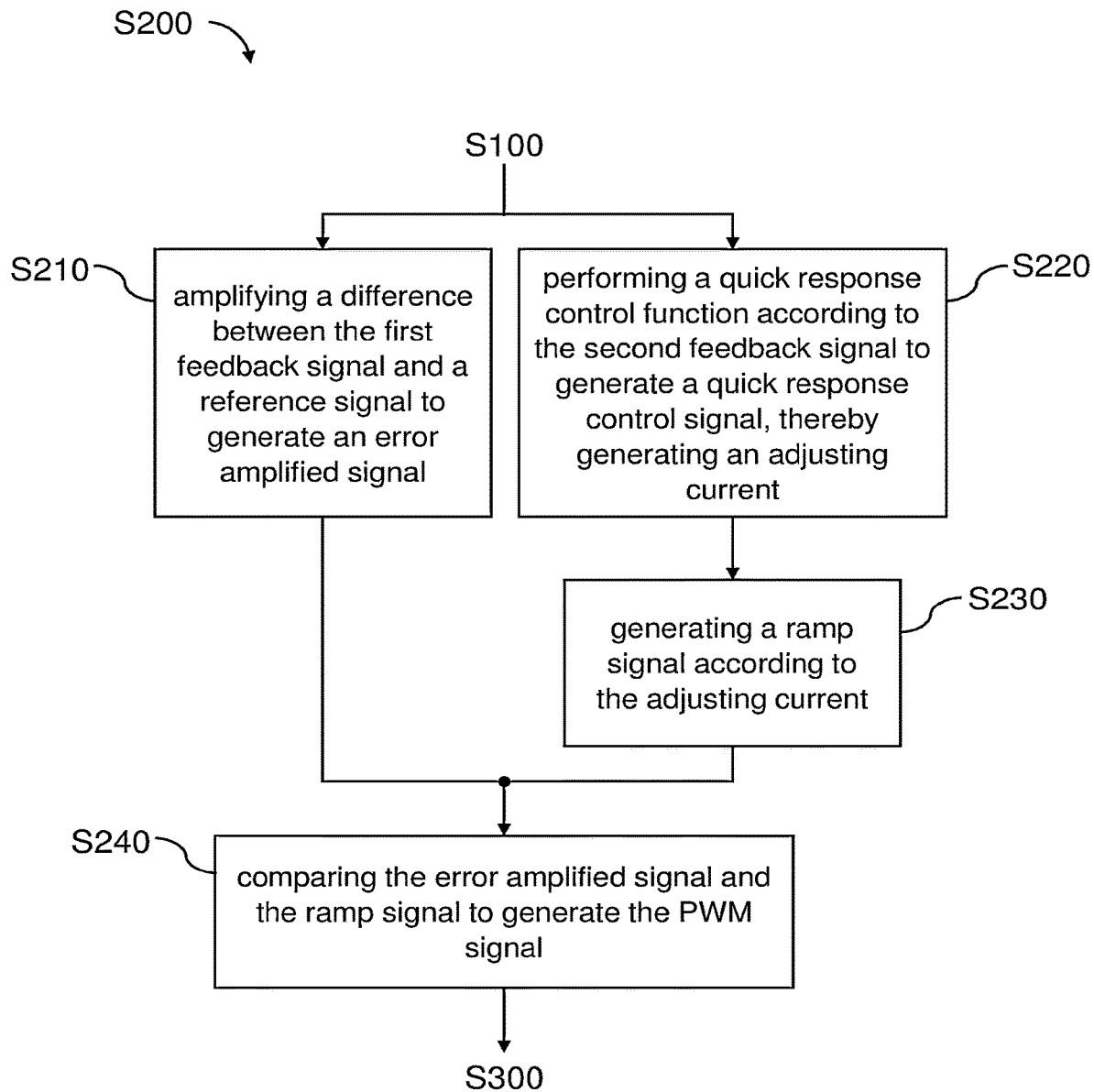
FIG. 9B is an operation flow chart of a conversion control circuit according to an embodiment of the present invention.

Please refer to FIG. 2 and FIG. 9B. FIG. 9B is an operation flow chart of the conversion control circuit 100 according to an embodiment of the present invention. As shown in FIG. 9B, when the conversion control circuit 100 generates the PWM signal Spwm according to the first feedback signal Vfb1 and the second feedback signal Vfb2 (corresponding to step S200 of FIG. 9A), the error amplifier circuit 110 of the conversion control circuit 100 amplifies a difference between the first feedback signal Vfb1 and a reference signal Vref to generate an error amplified signal Vea (step S210); in parallel, the quick response control circuit 140 of the conversion control circuit 100 performs a quick response control function according to the second feedback signal Vfb2 to generate a quick response control signal, thereby generating an adjusting current Isp (step S220). Then, the ramp signal generation circuit 120 of the conversion control circuit 100 generates a ramp signal Vramp according to the adjusting current Isp (step S230). The pulse width modulation circuit 130 of the conversion control circuit 100 compares the error amplified signal Vea and the ramp signal Vramp to generate the PWM signal Spwm (step S240).

Figure 9C:
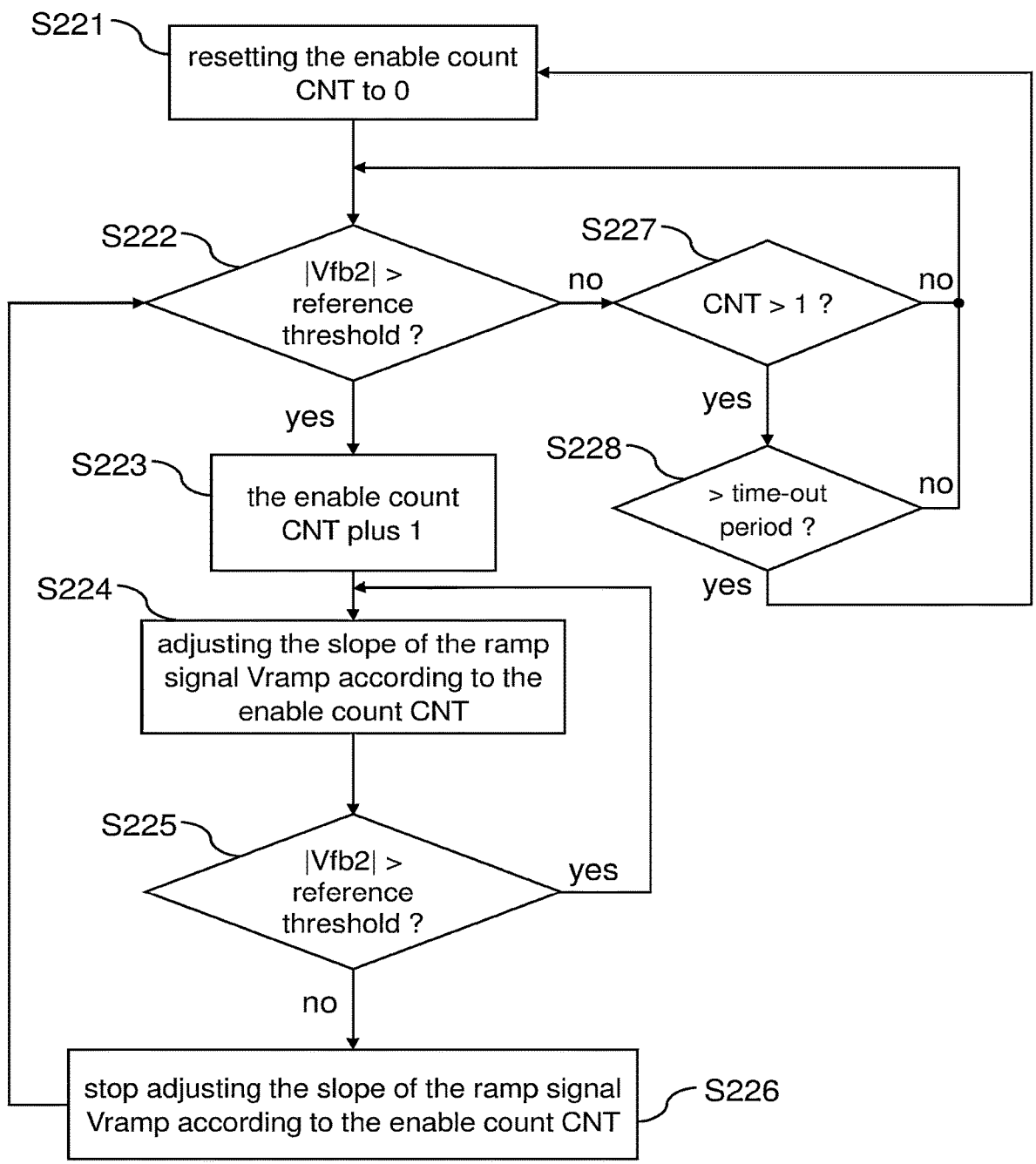
FIG. 9C is an operation flow chart of a quick response switching power converter performing a quick response control function according to an embodiment of the present invention.

Please refer to FIG. 6A and FIG. 9C. FIG. 9C is an operation flow chart of the quick response switching power converter 140 performing the quick response control function according to an embodiment of the present invention. As shown in FIG. 9C, when the quick response switching power converter 140 starts performing the quick response control function (corresponding to step S220 of FIG. 9B), the quick response switching power converter 140 resets the enable count CNT of the quick response control signal to 0 (step S221). Next, the comparators 141A, 141B of the quick response switching power converter 140 determine whether the absolute value of the second feedback signal Vfb2 crosses at least one reference threshold (step S222). When the absolute value of the second feedback signal Vfb2 increases or decreases to cross (i.e., pass over) at least one reference threshold, it indicates that the output voltage VOUT increases or decreases to cross at least one output threshold, and step S222 is determined yes. In this case, the quick response switching power converter 140 will add 1 to the enable count CNT (CNT plus 1, step S223), and the adjustment current source circuits 143A, 143B of the quick response switching power converter 140 will adjust the slope of the ramp signal Vramp according to the enable count CNT (step S224). Subsequently, the comparators 141A, 141B determines again whether the absolute value of the second feedback signal Vfb2 increases or decreases to cross at least one reference threshold (step S225). If yes, the adjustment current source circuits 143A and 143B will keep adjusting the slope of the ramp signal Vramp according to the enable count CNT; if no, the adjustment current source circuits 143A and 143B will stop adjusting the slope of the ramp signal Vramp according to the enable count CNT (step S226), and the comparators 141A and 141B will determine again whether the absolute value of the second feedback signal Vfb2 increases or decreases to cross at least one reference threshold (step S222).

In step S222, when the absolute value of the second feedback signal Vfb2 does not increase or decrease to cross at least one reference threshold, it indicates the output voltage VOUT does not increase or decrease to cross at least one output threshold, and step S222 is determined no. In this case, the quick response switching power converter 140 will determine whether the enable count CNT is higher than 1 (step S227). If no, the quick response switching power converter 140 will determine again whether the absolute value of the second feedback signal Vfb2 increases or decreases to cross at least one reference threshold (step S222). If it is yes in step S227, the operation flow will further determine whether a time-out period is exceeded after the quick response control signal is enabled for the m-th time (step S228), wherein m is a positive integer. When the time-out period is exceeded after the quick response control signal is enabled for the m-th time, the quick response switching power converter 140 will reset the enable count CNT; when the time-out period is not exceeded after the quick response control signal is enabled for the m-th time, the quick response switching power converter 140 will determine again whether the absolute value of the second feedback signal Vfb2 increases or decreases to cross at least one reference threshold (step S222).

Figure 10:
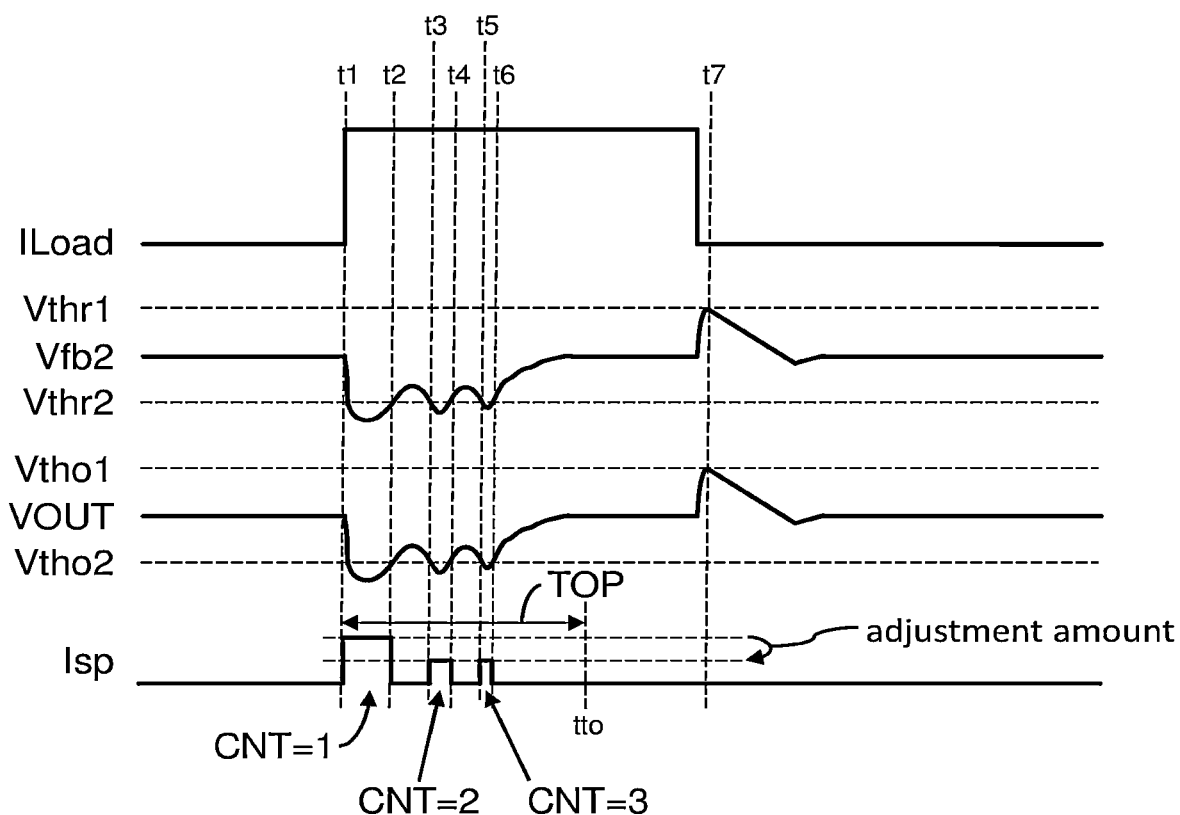
FIG. 10 is a schematic diagram of signal waveforms of a quick response switching power converter according to an embodiment of the present invention.

Please refer to FIG. 2 and FIG. 10. FIG. 10 is a schematic diagram of signal waveforms of the quick response switching power converter 10 according to an embodiment of the present invention. As shown in FIG. 10, in this embodiment, since the second feedback signal Vfb2 (corresponding to the output signal VOUT) decreases below the second reference threshold Vthr2 (corresponding to the second output threshold Vtho2) for 3 times, the quick response control signal is enabled 3 times in total, wherein the adjusting current Isp is generated according the quick response control signal. The first enablement of the quick response control signal occurs at the time point t1 (the enable count CNT is 1), and the second feedback signal Vfb2 maintains lower than the second reference threshold Vthr2 until the time point t2; the second enablement of the quick response control signal occurs at the time point t3 (the enable count CNT is 2), and the second feedback signal Vfb2 maintains lower than the second reference threshold Vthr2 until the time point t4; the third enablement of the quick response control signal occurs at the time point t5 (the enable count CNT is 3), and the second feedback signal Vfb2 maintains lower than the second reference threshold Vthr2 until the time point t6. In this embodiment, for example, the adjusting signals AS1-AS4 are adjusted according to the quick response control signal and the enable count CNT, to generate the adjusting current Isp.

In this embodiment, when the enable count CNT is 1, the adjusting current Isp is generated according to the quick response control signal and has a relatively higher current level, that is, the adjustment amount is relatively higher; when the enable count CNT is 2 or 3, the adjusting current Isp is generated according to the quick response control signal and has a relatively lower current level, that is, the adjustment amount is relatively lower. As shown at the time point t7, when the output voltage VOUT rises whereby the second feedback signal Vfb2 rise, since the second feedback signal Vfb2 (corresponding to the output voltage VOUT) is not higher than the first reference threshold Vthr1 (corresponding to the first output threshold Vtho1), the quick response control signal is not enabled, and the quick response control function is not performed. In addition, in this embodiment, when the time-out period TOP is exceeded after the quick response control signal is enabled for the first time, the quick response switching power converter 140 will reset the enable count to 0.

In some embodiments, when the quick response control signal is enabled for the n-th time, the quick response switching power converter 140 will adjust the slope of the ramp signal Vramp with an n-th time adjustment amount; when the quick response control signal is enabled for the (n+1)-th time, the quick response switching power converter 140 will adjust the slope of the ramp signal with an (n+1)-th time adjustment amount, wherein n is a positive integer, and the absolute value of the n-th time adjustment amount is higher than or equal to the absolute value of the (n+1)-th time adjustment amount. As shown in FIG. 10, in this embodiment, the absolute value of the first time adjustment amount when the enable count is 1 (i.e., the quick response control signal is enabled for the first time) is higher than the absolute value of the second time adjustment amount when the enable count is 2 (i.e., the quick response control signal is enabled for the second time), and the absolute value of the second time adjustment amount is equal to the absolute value of the third time adjustment amount.

Figure 11A:
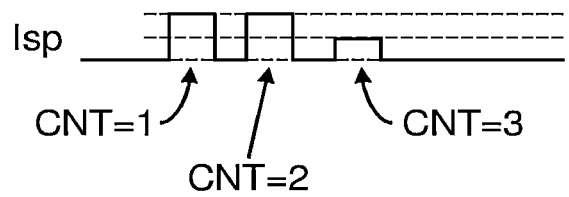
FIG. 11A is a schematic diagram of a current waveform of an adjusting current according to an embodiment of the present invention.

In some embodiments, when the quick response control signal is enabled, there is at least once that the absolute value of the n-th time adjustment amount is higher than the absolute value of the (n+1)-th time adjustment amount. Please refer to FIG. 11A. FIG. 11A is a schematic diagram of a current waveform of the adjusting current Isp generated according to the quick response control signal according to an embodiment of the present invention. As shown in FIG. 11A, in this embodiment, the quick response control signal is enabled for 3 times in total, wherein the absolute value of the second time adjustment amount is higher than the absolute value of the third time adjustment amount. Thus, the level of the adjusting current Isp when the enable count CNT is 1 and 2 is higher than the level of the adjusting current Isp when the enable count CNT is 3.

Figure 11B:
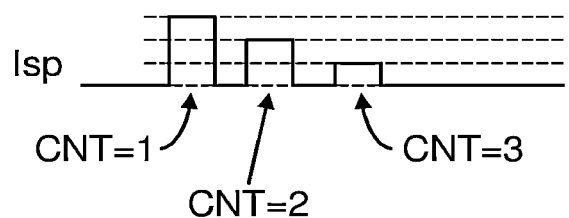
FIG. 11B is a schematic diagram of a current waveform of an adjusting current according to an embodiment of the present invention.

In some embodiments, when the quick response control signal is enabled, the absolute value of the n-th time adjustment amount is always higher than the absolute value of the (n+1)-th time adjustment amount. Please refer to FIG. 11B. FIG. 11B is a schematic diagram of a current waveform of the adjusting current Isp generated according to the quick response control signal according to an embodiment of the present invention. As shown in FIG. 11B, in this embodiment, the quick response control signal is enabled for 3 times in total, wherein the absolute value of the first time adjustment amount is higher than the absolute value of the second time adjustment amount, and the absolute value of the second time adjustment amount is higher than the absolute value of the third time adjustment amount. Thus, the level of the adjusting current Isp when the enable count CNT is 1 is higher than the level of the adjusting current Isp when the enable count CNT is 2, and the level of the adjusting current Isp when the enable count CNT is 2 is higher than the level of the adjusting current Isp when the enable count CNT is 3.

Figure 11C:
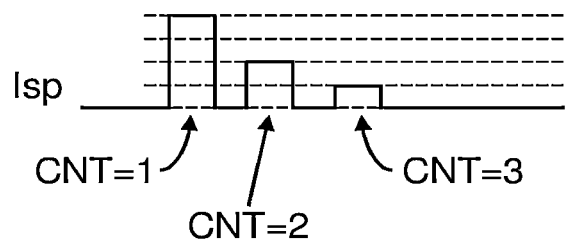
FIG. 11C is a schematic diagram of a current waveform of an adjusting current according to an embodiment of the present invention.

In some embodiments, the absolute value of the n-th time adjustment amount is 2 times of the absolute value of the (n+1)-th time adjustment amount. Please refer to FIG. 11C. FIG. 11C is a schematic diagram of a current waveform of the adjusting current Isp generated according to the quick response control signal according to an embodiment of the present invention. As shown in FIG. 11C, in this embodiment, the quick response control signal is enabled for 3 times in total, wherein the absolute value of the first time adjustment amount is 2 times of the absolute value of the second time adjustment amount, and the absolute value of the second time adjustment amount is 2 times of the absolute value of the third time adjustment amount. Thus, the level of the adjusting current Isp when the enable count CNT is 1 is 2 times of the level of the adjusting current Isp when the enable count CNT is 2, and the level of the adjusting current Isp when the enable count CNT is 2 is 2 times of the level of the adjusting current Isp when the enable count CNT is 3.

Figure 12:
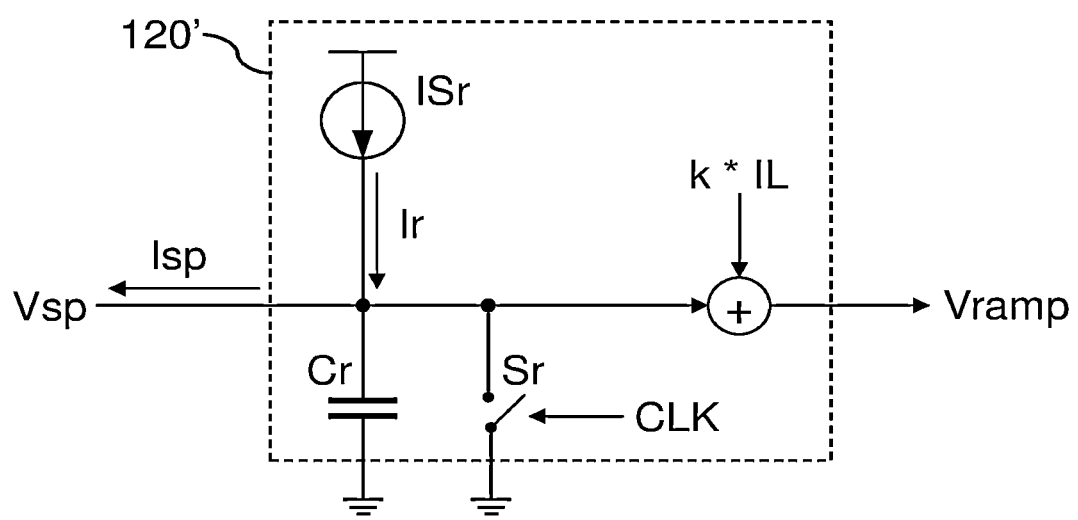
FIG. 12 is a schematic circuit diagram of a ramp signal generation circuit according to another embodiment of the present invention.

Please refer to FIG. 12. FIG. 12 is a schematic circuit diagram of a ramp signal generation circuit 120' according to another embodiment of the present invention, wherein the ramp signal generation circuit 120' is a variation of the ramp signal generation circuit 120 in FIG. 2. As shown in FIG. 12, in some embodiments, compared to the ramp signal generation circuit 120, the ramp signal generation circuit 120' further includes an adder, wherein the adder is configured to add the product of the current IL of the inductor L multiplied by a factor k onto the ramp signal Vramp, thereby further adjusting the slope of the ramp signal Vramp. An adder is a well known circuit to a person having ordinary skills in the art, and thus its details are not redundantly explained herein.

Figure 13:
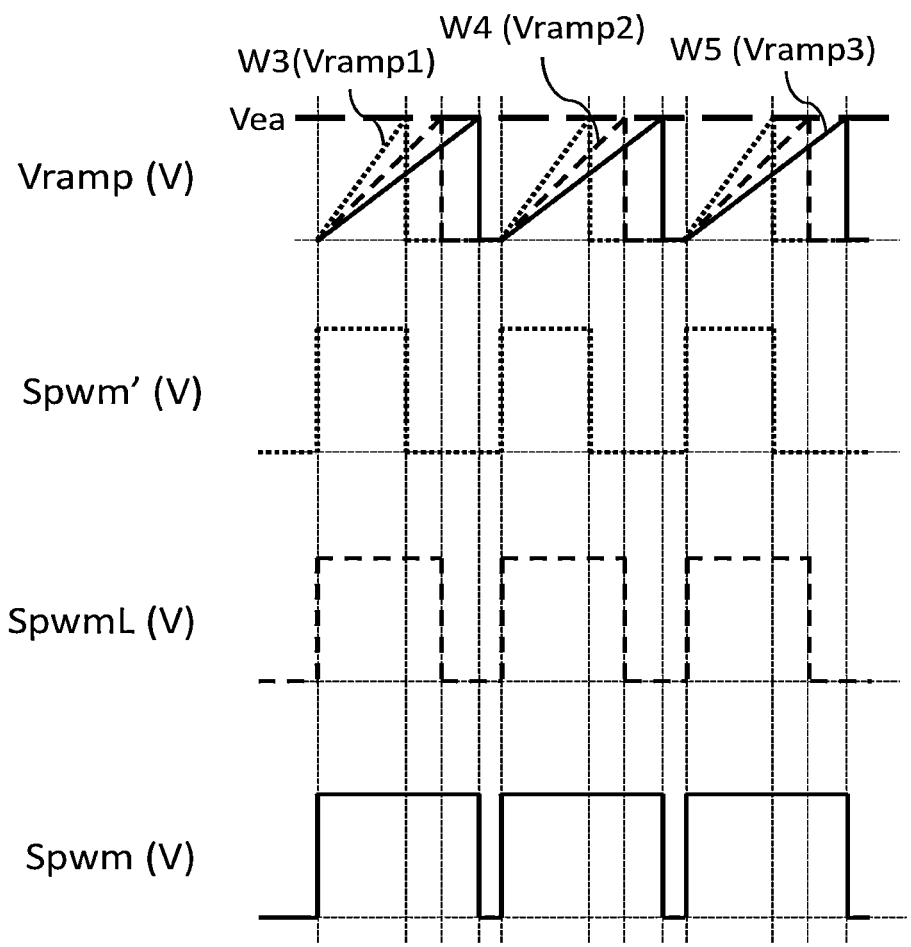
FIG. 13 is a schematic diagram of voltage waveforms of a ramp signal and pulse width modulation signals according to another embodiment of the present invention.

Please refer to FIG. 13. FIG. 13 is a schematic diagram of voltage waveforms of the ramp signal Vramp according to another embodiment of the present invention. As shown in FIG. 13, in this embodiment, the dotted line waveform W3 is the initial ramp signal Vramp1 before adjustment; the dashed line waveform W4 is the ramp signal Vramp2 and the solid line waveform W5 is the ramp signal Vramp3 after adjustment of the current IL of the inductor L. Due to the quick response function of the quick response control circuit 140 and the adjustment current IL of the inductor L, the slope of the ramp signal Vramp3 is lower than the slope of the initial ramp signal Vramp1, so that the duty of the PWM signal Spwm is higher than the duty of the initial PWM signal Spwm' and the duty of the PWM signal SpemL, thereby accelerating the transient response of the quick response switching power converter 140.

Figure 14A:
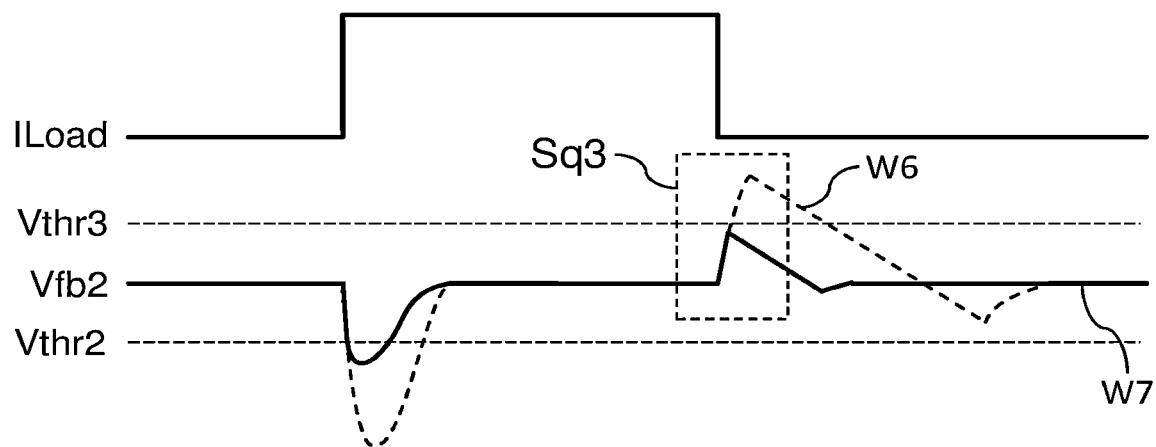
FIG. 14A is a schematic diagram of signal waveforms of a quick response control circuit according to an embodiment of the present invention.

Please refer to FIG. 2 and FIG. 14A. FIG. 14A is a schematic diagram of signal waveforms of the quick response control circuit 140 according to an embodiment of the present invention. As shown in FIG. 14A, in some embodiments, when the second feedback signal Vfb2 crosses a third reference threshold Vthr3 (as shown by the dashed frame Sq3 and the dashed waveform W6), the quick response control circuit 140 will stop controlling the power stage circuit 200, so that the power switches Q1 and Q2 are turned off, whereby the second feedback signal Vfb2 will recover faster to stable state to accelerate the transient response of the quick response switching power converter 140 (as shown in a solid line waveform W7).

Figure 14B:
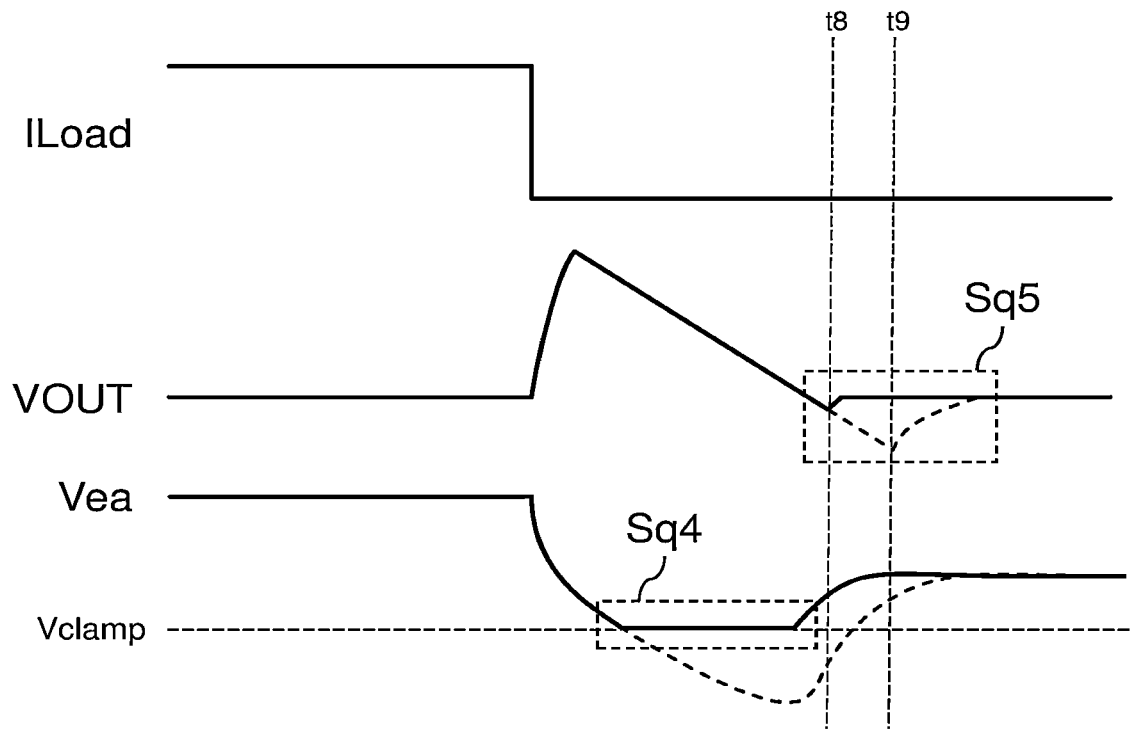
FIG. 14B is a schematic diagram of signal waveforms of a quick response control circuit according to another embodiment of the present invention.

Please refer to FIG. 14B. FIG. 14B is a schematic diagram of signal waveforms of the quick response control circuit 140 according to another embodiment of the present invention. As shown in FIG. 14B, in some embodiments, the quick response control circuit 140 will clamp the error amplified signal so that it does not exceed a predetermined clamping level Vclamp (as shown by the dashed frame Sq4), whereby the output voltage VOUT will recover faster to stable state to accelerate the transient response of the quick response switching power converter 140 (as shown by the time point t8 in the dashed frame Sq5). In some embodiments, the output voltage VOUT and the error amplified signal Vea have the dashed waveforms, indicating that the error amplified signal Vea is not clamped, whereby the error amplified signal Vea is still decreasing when it is lower than the predetermined clamping level Vclamp, so that the output voltage VOUT is not regulated to the predetermined target level even until the time point t9. In contrast, the solid line waveforms of the output voltage VOUT and the error amplified signal Vea indicate that the error amplified signal Vea is clamped; in this case when the error amplified signal Vea decreases to the predetermined clamping level Vclamp and is clamped and maintained at the predetermined clamping level Vclamp, so that the output voltage VOUT is regulated to the predetermined target level as early as the time point t8.

Figure 15:
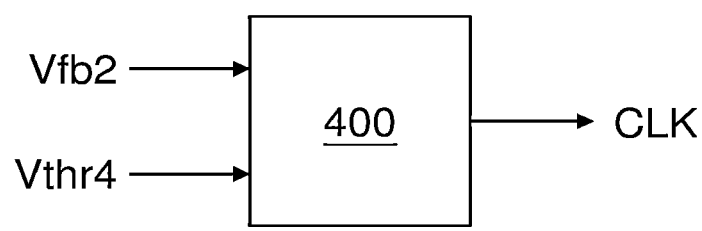
FIG. 15 is a schematic circuit diagram of a clock signal adjustment circuit according to an embodiment of the present invention.
Figure 16G:
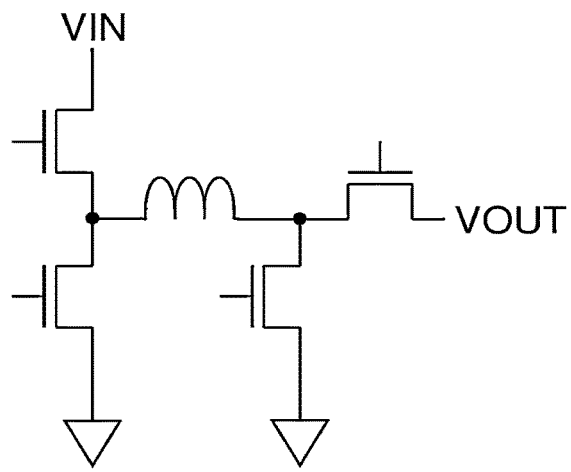
Figure 16H:
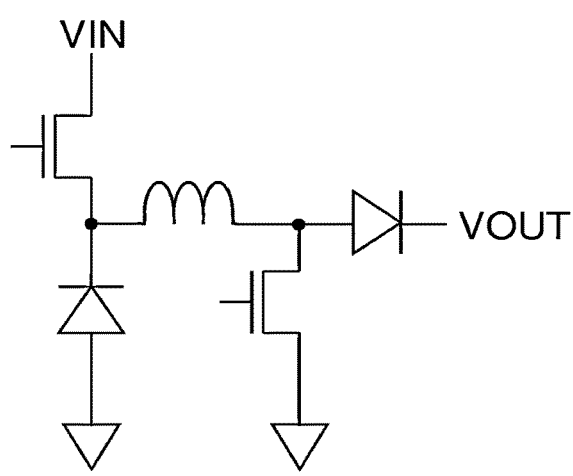
Figure 16I:
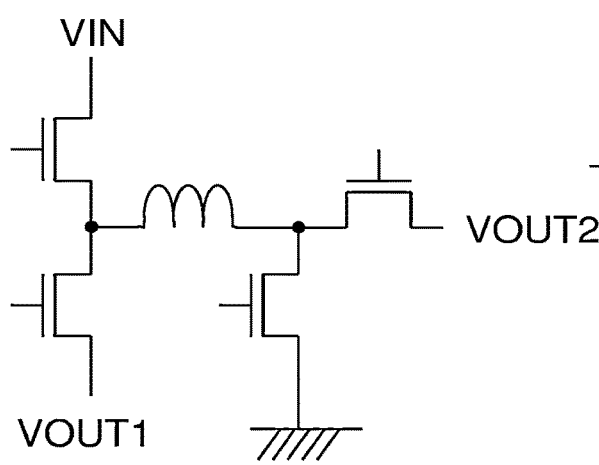
Figure 16J:
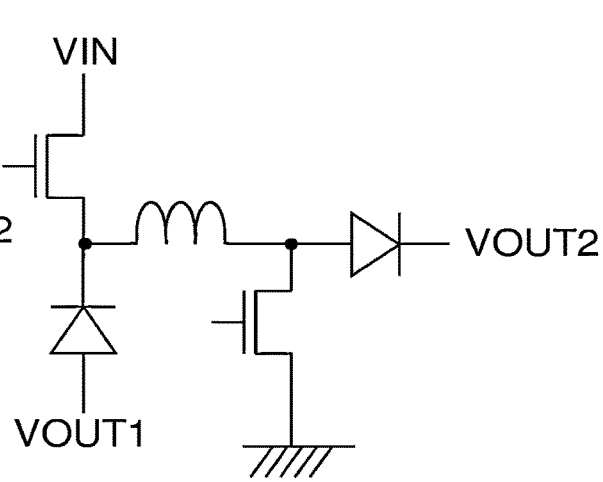

Please refer to FIG. 15. FIG. 15 is a schematic circuit diagram of a clock signal adjustment circuit 400 according to an embodiment of the present invention. As shown in FIG. 15, in some embodiments, a clock signal adjustment circuit 400 is configured to generate the clock signal CLK according to the second feedback signal Vfb2 and a fourth reference threshold Vthr4, wherein when the second feedback signal Vfb2 crosses the fourth reference threshold, the clock signal adjustment circuit 400 adjusts the frequency of the clock signal CLK to change the frequency of the ramp signal Vramp, thereby adjusting the duty of the PWM signal Spwm.

Please refer to FIG. 16A to FIG. 16J. FIG. 16A to FIG. 16J are schematic circuit diagrams of the power stage circuit 200 according to some embodiments of the present invention. As shown in FIG. 16A to FIG. 16J, the quick response switching power converter 10 of the present invention can be applied to the power stage circuits in various types switching power converters, for example, but not limited to a boost power stage circuit, a buck power stage circuit, a buck-boost power stage circuit, a switched-capacitor power converter or a switched tank power converter (STC).

Figure 17:
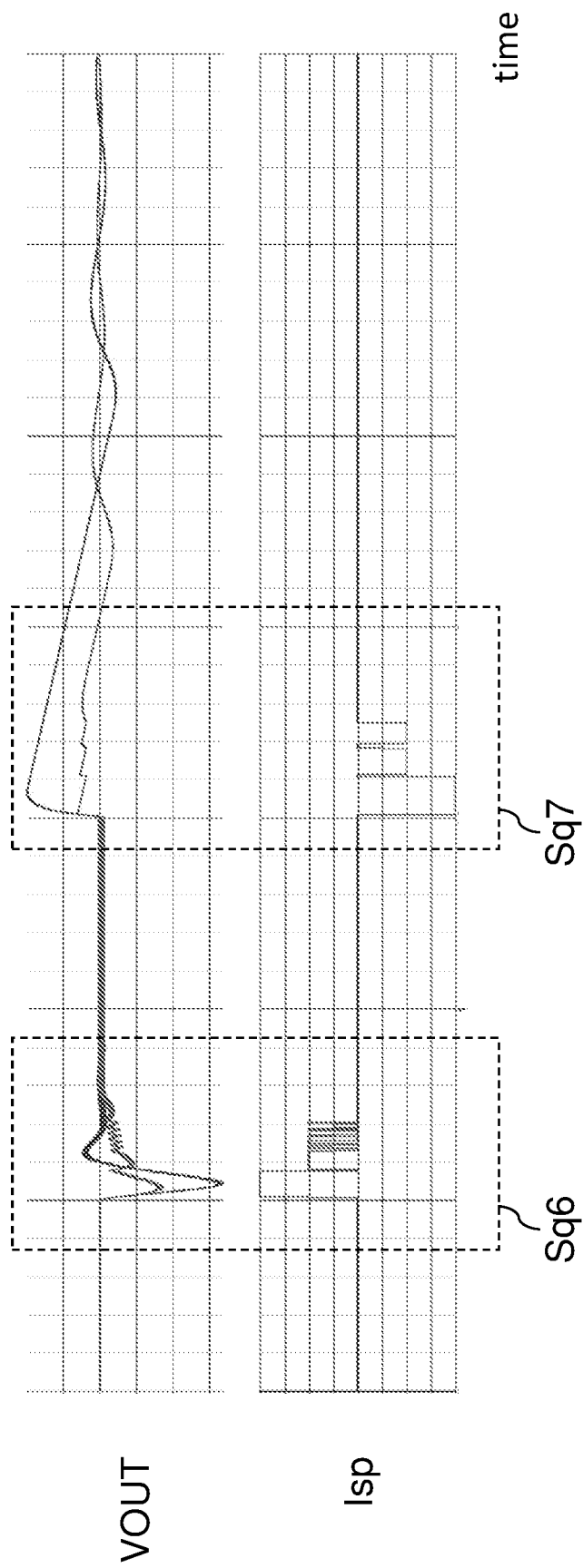
FIG. 17 is a schematic diagram of signal simulation waveforms of a quick response switching power converter according to an embodiment of the present invention.

Please refer to FIG. 17. FIG. 17 is a schematic diagram of signal simulation waveforms of the quick response switching power converter 10 according to an embodiment of the present invention. As shown in the dashed frame Sq6 in FIG. 17, when the output voltage VOUT undershoots, the quick response switching power converter 140 will adjust the slope of the ramp signal Vramp according to the enable count CNT of the quick response control signal, thereby accelerating the increase of the duty of the PWM signal Spwm, so as to accelerate the transient response of the quick response switching power converter 10; as shown in the dashed fame Sq7 in FIG. 17, when the output voltage VOUT overshoots, the quick response switching power converter 140 will adjust the slope of the ramp signal Vramp according to the enable count CNT of the quick response control signal, thereby accelerating the decrease of the duty of the PWM signal Spwm, so as to accelerate the transient response of the quick response switching power converter 10.

As described above, the quick response switching power converter 10 and the conversion control circuit 100 thereof according to the present invention performs a quick response control function to adjust the slope of the ramp signal Vramp, so as to accelerate the increase or decrease of the duty of a PWM signal Spwm, thereby accelerating the transient response of the quick response switching power converter 10. In this way, the negative effects caused by a load transient can be effectively mitigated, to improve the stability of the output power.

The present invention has been described in considerable detail with reference to certain preferred embodiments thereof. It should be understood that the description is for illustrative purpose, not for limiting the present invention. Those skilled in this art can readily conceive variations and modifications within the spirit of the present invention. The various embodiments described above are not limited to being used alone; two embodiments may be used in combination, or a part of one embodiment may be used in another embodiment. For example, other process steps or structures, such as a metal silicide layer, may be added. For another example, the lithography process step is not limited to the mask technology but it can also include electron beam lithography, immersion lithography, etc. Therefore, in the same spirit of the present invention, those skilled in the art can think of various equivalent variations and various combinations, and there are many combinations thereof, and the description will not be repeated here. The scope of the present invention should include what are defined in the claims and the equivalents.

What is claimed is:

1. A conversion control circuit, which is for use in a quick response switching power converter and is configured to control a power stage circuit according to a first feedback signal and a second feedback signal, the conversion control circuit comprising:
   an error amplifier circuit, which is configured to amplify a difference between the first feedback signal and a reference signal, so as to generate an error amplified signal;
   a ramp signal generation circuit, which is configured to generate a ramp signal;
   a pulse width modulation circuit, which is configured to compare the error amplified signal and the ramp signal to generate a pulse width modulation (PWM) signal, wherein the PWM signal is configured to control the power stage circuit, thereby regulating an output voltage to a predetermined target level; and
   a quick response control circuit, which is configured to perform a quick response control function, wherein the quick response control function includes:
      comparing the second feedback signal with at least one reference threshold to determine whether the output voltage crosses an output threshold, and generating a quick response control signal accordingly; and
      when the second feedback signal crosses the reference threshold, adjusting the slope of the ramp signal according to the quick response control signal, to accelerate an increase or decrease of a duty of the PWM signal, thereby accelerating a transient response of the quick response switching power converter;
   wherein the first feedback signal and the second feedback signal are positively related to the output voltage.

2. The conversion control circuit of claim 1, wherein the quick response control function further includes:
   when the second feedback signal crosses the reference threshold, adjusting the slope of the ramp signal according to an enable count of the quick response control signal, to adaptively increase or decrease the duty cycle of the PWM signal, thereby accelerating the transient response of the quick response switching power converter, wherein the enable count is a number of times that the quick response control signal is switched to an enable level.

3. The conversion control circuit of claim 2, wherein the quick response control function further includes:
when the quick response control signal is enabled for an n-th time, adjusting the slope of the ramp signal with an n-th time adjustment amount; and
when the quick response control signal is enabled for an (n+1)-th time, adjusting the slope of the ramp signal with an (n+1)-th time adjustment amount;
wherein, n is a positive integer, and an absolute value of the n-th time adjustment amount is higher than or equal to an absolute value of the (n+1)-th time adjustment amount.

4. The conversion control circuit of claim 3, wherein the quick response control function further includes:
when a time-out period is exceeded after the quick response control signal is enabled for an m-th time, resetting the enable count of the quick response control signal, wherein m is a positive integer.

5. The conversion control circuit of claim 3, wherein the quick response control function further includes:
performing at least once that the absolute value of the n-th time adjustment amount is higher than the absolute value of the (n+1)-th time adjustment amount.

6. The conversion control circuit of claim 1, wherein the ramp signal generation circuit includes a ramp current source, a capacitor, and at least one control switch, wherein the at least one control switch is configured to control the ramp current source to charge the capacitor according to a clock signal, so as to generate the ramp signal; and wherein the quick response control circuit includes at least one adjustment current source circuit which is configured to generate an adjusting current, and the quick response control circuit is configured to charge the capacitor by a current resulting from superimposing the adjusting current onto the current generated by the ramp current source when the quick response control signal is enabled, so as to accelerate the increase or decrease of the duty of the PWM signal, thereby accelerating the transient response of the quick response switching power converter.

7. The conversion control circuit of claim 6, wherein the at least one reference threshold includes a first reference threshold and/or a second reference threshold, and the at least one output threshold includes a first output threshold and/or a second output threshold;
wherein when the second feedback signal is higher than the first reference threshold, which indicates that the output voltage is higher than the first output threshold, the quick response control circuit controls the adjusting current to increase an absolute value of the slope of the ramp signal, thereby accelerating the decrease of the duty of the PWM signal, wherein the first output threshold is higher than the predetermined target level; and
wherein when the second feedback signal is lower than the second reference threshold, which indicates that the output voltage is lower than the second output threshold, the quick response control circuit controls the adjusting current to decrease the absolute value of the slope of the ramp signal, thereby accelerating the increase of the duty of the PWM signal, wherein the second output threshold is lower than the predetermined target level.

8. The conversion control circuit of claim 1, wherein the first feedback signal is the second feedback signal.

9. The conversion control circuit of claim 1, wherein the ramp signal includes an inductor current related signal, wherein the inductor current related signal is related to a current of an inductor of the power stage circuit, a conduction current of at least one power switch of the power stage circuit, or an output current of an output power, wherein the output power includes the output voltage and the output current.

10. The conversion control circuit of claim 1, wherein the quick response control function further includes at least one of the following:
when the second feedback signal crosses a third reference threshold, stopping controlling the power stage circuit;
clamping the error amplified signal so that the error amplified signal does not exceed a predetermined clamping level; and/or
when the second feedback signal crosses a fourth reference threshold, adjusting a frequency of the clock signal.

11. A quick response switching power converter, comprising:
a power stage circuit, which includes at least one power switch, the at least one power switch being configured to switch one terminal of an inductor and/or the other terminal of the inductor to convert an input power to an output power;
a conversion control circuit, which is configured to control the at least one power switch according to a first feedback signal and a second feedback related to an output voltage of the output power; and
a feedback circuit, which is configured to generate the first feedback signal and the second feedback signal according to the output voltage;
wherein the conversion control circuit includes:
an error amplifier circuit, which is configured to amplify a difference between the first feedback signal and a reference signal, so as to generate an error amplified signal;
a ramp signal generation circuit, which is configured to generate a ramp signal;
a pulse width modulation circuit, which is configured to compare the error amplified signal and the ramp signal to generate a pulse width modulation (PWM) signal, wherein the PWM signal is configured to control the power stage circuit, thereby regulating the output voltage to a predetermined target level; and
a quick response control circuit, which is configured to perform a quick response control function, wherein the quick response control function includes:
comparing the second feedback signal with at least one reference threshold to determine whether the output voltage crosses an output threshold, and generating a quick response control signal accordingly; and
when the second feedback signal crosses the reference threshold, adjusting the slope of the ramp signal according to the quick response control signal, to accelerate an increase or decrease of a duty of the PWM signal, thereby accelerating a transient response of the quick response switching power converter.

12. The quick response switching power converter of claim 11, wherein the quick response control function further includes:
when the second feedback signal crosses the reference threshold, adjusting the slope of the ramp signal according to an enable count of the quick response control signal, to adaptively increase or decrease the duty cycle of the PWM signal, thereby accelerating the transient response of the quick response switching power converter, wherein the enable count is a number of times that the quick response control signal is switched to an enable level.

13. The quick response switching power converter of claim 12, wherein the quick response control function further includes:

when the quick response control signal is enabled for an n-th time, adjusting the slope of the ramp signal with an n-th time adjustment amount; and when the quick response control signal is enabled for an (n+1)-th time, adjusting the slope of the ramp signal with an (n+1)-th time adjustment amount;

wherein, n is a positive integer, and an absolute value of the n-th time adjustment amount is higher than or equal to an absolute value of the (n+1)-th time adjustment amount.

14. The quick response switching power converter of claim 13, wherein the quick response control function further includes:

when a time-out period is exceeded after the quick response control signal is enabled for an m-th time, resetting the enable count of the quick response control signal, wherein m is a positive integer.

15. The quick response switching power converter of claim 13, wherein the quick response control function further includes:

performing at least once that the absolute value of the n-th time adjustment amount is higher than the absolute value of the (n+1)-th time adjustment amount.

16. The quick response switching power converter of claim 11, wherein the ramp signal generation circuit includes a ramp current source, a capacitor, and at least one control switch, wherein the at least one control switch is configured to control the ramp current source to charge the capacitor according to a clock signal, so as to generate the ramp signal; and wherein the quick response control circuit includes at least one adjustment current source circuit which is configured to generate an adjusting current, and the quick response control circuit is configured to charge the capacitor by a current resulting from superimposing the adjusting current onto the current generated by the ramp current source when the quick response control signal is enabled, so as to accelerate the increase or decrease of the duty of the PWM signal, thereby accelerating the transient response of the quick response switching power converter.

17. The quick response switching power converter of claim 16, wherein the at least one reference threshold includes a first reference threshold and/or a second reference threshold, and the at least one output threshold includes a first output threshold and/or a second output threshold;

wherein when the second feedback signal is higher than the first reference threshold, which indicates that the output voltage is higher than the first output threshold, the quick response control circuit controls the adjusting current to increase an absolute value of the slope of the ramp signal, thereby accelerating the decrease of the duty of the PWM signal, wherein the first output threshold is higher than the predetermined target level; and wherein when the second feedback signal is lower than the second reference threshold, which indicates that the output voltage is lower than the second output threshold, the quick response control circuit controls the adjusting current to decrease the absolute value of the slope of the ramp signal, thereby accelerating the increase of the duty of the PWM signal, wherein the second output threshold is lower than the predetermined target level.

18. The quick response switching power converter of claim 11, wherein the first feedback signal is the second feedback signal.

19. The quick response switching power converter of claim 11, wherein the ramp signal includes an inductor current related signal, wherein the inductor current related signal is related to a current of an inductor of the power stage circuit, a conduction current of at least one power switch of the power stage circuit, or an output current of an output power, wherein the output power includes the output voltage and the output current.

20. The quick response switching power converter of claim 11, wherein the quick response control function further includes at least one of the following:

when the second feedback signal crosses a third reference threshold, stopping controlling the power stage circuit;

clamping the error amplified signal so that the error amplified signal does not exceed a predetermined clamping level;

and/or when the second feedback signal crosses a fourth reference threshold, adjusting a frequency of the clock signal.

* * * * *